United States Patent [19]
Ikeda et al.

[11] Patent Number: 5,990,878
[45] Date of Patent: Nov. 23, 1999

[54] SIGN LANGUAGE EDITING APPARATUS

[75] Inventors: Hisashi Ikeda, Kokubunji; Hirohiko Sagawa, Kodaira; Tomoko Sakiyama, Tokyo; Masaru Ohki, Tokorozawa; Youichi Kaneko, Kodaira, all of Japan

[73] Assignee: Hitachi, Ltd., Tokyo, Japan

[21] Appl. No.: 08/648,703

[22] Filed: May 16, 1996

[30] Foreign Application Priority Data

May 18, 1995 [JP] Japan .................................. 7-144123

[51] Int. Cl.⁶ .................................................. G06F 15/00
[52] U.S. Cl. ........................ 345/302; 345/474; 345/475; 707/532
[58] Field of Search .................................. 345/156, 122, 345/473–475, 302; 395/173–175, 806, 807, 949–960, 753; 707/532

[56] References Cited

U.S. PATENT DOCUMENTS

| 4,884,972 | 12/1989 | Gasper .................................... 434/185 |
| 5,659,764 | 8/1997 | Sakiyama et al. ....................... 395/753 |

FOREIGN PATENT DOCUMENTS

| 0 466 154 | 1/1992 | European Pat. Off. . |
| 0 586 259 | 9/1994 | European Pat. Off. . |
| 06251123 | 9/1994 | Japan . |
| 06337627 | 12/1994 | Japan . |
| 06337628 | 12/1994 | Japan . |
| 07311545 | 11/1995 | Japan . |

OTHER PUBLICATIONS

Sakiyama et al., "A Generation Method for Real–Time Sign Language Animation", Transactions of the Institute of Electronics, Information and Communication Engineers, v. J79D–II, Feb. 1996.

Sagawa et al., "Sign–Language Recognition Method Using Compressed Continuous DP Matching", Tansactions of the Institute of Electronics, Information and Communication Engineers, v. J77–D–II, pp. 753–763, 1994.

(List continued on next page.)

*Primary Examiner*—Mark K. Zimmerman
*Assistant Examiner*—Motilewa Good-Johnson
*Attorney, Agent, or Firm*—Antonelli, Terry, Stout & Kraus, LLP

[57] ABSTRACT

A sign language editing apparatus includes a glove-type sensor for converting movement of fingers in the sign language into an electrical signal to produce time series data of sign language words, a sign language word data editing device for adding predetermined additional data to the time series data inputted from the glove-type sensor to process the time series data, a sign language word dictionary for storing the time series data of sign language words processed by the sign language word data editing device, a sign language sentence data editing device for reading out the time series data of sign language words stored in the sign language word dictionary in accordance with the predetermined characters inputted from the input unit and adding predetermined additional information to the time series data of sign language words to produce time series data of sign language sentence, a sign language animation synthesizing device inputted with the time series data of sign language sentence produced by the sign language sentence data editing device to produce sign language animation expressing movement of the sign language, and a display unit for displaying the sign language animation produced by the sign language animation synthesizing device.

15 Claims, 30 Drawing Sheets

OTHER PUBLICATIONS

Liddell et al., Japanese Journal of Sign Linguistics, Japanese Sign Linguistics Association, v. 12, pp. 31–37, 1991.

Kanda et al., "The II Trial Version of JSL Computerized Dictionary", 1994.

Xu et al., "Gesture Description and Structure of a Dictionary for Intelligent Communication of Sign Language Images", Electronics and Communications in Japan Part III, v. 77 abstract, 1994.

Xu et al., "Gesture description and structure of a dictionary for intelligent communication of sign language images", Electronics and Communications in Japan, pp. 62–74, Mar. 1994.

Applications and Impacts: Information Processing, 1994 Hamburg, Aug. 28–Sep. 2, 1994; vol. 2; Edited by K. Brunnstein and E. Raubold; pp. 702–707 "Computer assistance in learning sign language" by R. Schulmeister.

Eurographics, Vienna, Sep. 2–6, 1991; Edited by F.H. Post and W. Barth; pp. 33–45; "Faces: Facial Animation, Construction and Editing System" by M. Patel, et al.

Computer Graphics, vol. 17, Jul. 1983; U.S. pp. 105–114 "Computer Graphic Modeling of American Sign Language" by Loomis, et al.

IEICE Transactions on Fundamentals of Electronics, Communications and Computer Sciences, vol. E–75–A, Feb. 1, 1992, pp. 112–121 "Gesture Coding and a Gesture Dictionary for a Nonverbal Interface" by T. Kurokawa.

ESCA Workshop KTH, Stockholm, May 31, 1993–Jun. 2, 1993, pp. 83–85, Design of a system for Electronic Dictionary of Japanese Sign Language by Fukuda, et al.

Electronics and Communications in Japan—Part III, Fundamental Electronic Science, vol. 77, No. 3, Mar. 1994 New York, U.S., pp. 62–74 "Gesture Description and Structure of a Dictionary for Intelligent Communication of Sign Language Images" by Xu, et al.

Gestures and neural networks in human–computer interaction, Beale and Edwards, Department of computer science, University of York, York, pp. 1–5, 1992.

TeleSign: A sign language telecommunication system, Chapin et al., Center for design research, Standford University, IEEE, 1992.

Visual Translation: From native language to sign language, Lee and Kunii, Department of Information Science, The University Of Tokyo, IEEE, 1992.

Sign–Language Recognition Method Using Compressed Continuous DP Matching, Journal of the Institute of Electronics, Information and Communication Engineers, D–II, vol. J77–D–II No. 4 pp. 753–763 Apr. 1994.

Extended abstracts of 20th Assembly of Japanese Sign Linguistics Association Jul. 23 and 24, 1994.

Japanese Journal of Sign Linguistics 1991. vol. 12.

Japanese Patent Application No. 6–101097.

FIG.5

| | |
|---|---|
| 501 | SIGN LANGUAGE LABEL |
| 502 | JAPANESE (TRANSLATED) |
| 503 | SIGN LANGUAGE WORD HEADING 1 |
| | ⋮ |
| | SIGN LANGUAGE WORD HEADING n |
| 504 | NUMBER OF FINGER MOVEMENTS |
| 505 | FINGER MOVEMENT HEADING 1 |
| | ⋮ |
| | FINGER MOVEMENT HEADING m |
| 506 | POINTER TO MOUTH SHAPE DATA |
| 507 | POINTER TO EXPRESSION DATA |
| 508 | POINTER TO GESTURE DATA |
| 509 | CHANGED DATA FOR FINGER MOVEMENT |

FIG.6

| | |
|---|---|
| 601 | SIGN LANGUAGE WORD HEADING |
| 602 | JAPANESE WORD HEADING |
| 603 | NUMBER OF FINGER MOVEMENTS |
| 604 | FINGER MOVEMENT HEADING 1 |
| | ⋮ |
| | FINGER MOVEMENT HEADING m |
| 605 | POINTER TO MOUTH SHAPE DATA |
| 606 | POINTER TO EXPRESSION DATA |
| 607 | POINTER TO GESTURE DATA |

FIG.36

```
FILE  EDITING  MODE  ENVIRONMENT  DICTIONARY
```

SIGN LANGUAGE SENTENCE LABEL    FOLDER [            ]    FILE [SENTENCE 1]

JAPANESE    [I BUY A BOOK.]

SIGN LANGUAGE WORD SERIES    [I   P3   BUY   A BOOK]   3401

3402    SELECTION RANGE [  ] ~ [  ] FRAME

| SIGN LANGUAGE WORD | I | P3 | BUY | A BOOK |
|---|---|---|---|---|
| FINGER MOVEMENT | I |  | BUY | A BOOK |
| NUMBER OF FRAMES |  | 10 |  | 20 |
| FRAME | ////// | ////// | ////// | ////// |
| EXPRESSION | SMILING FACE |  | NORMAL | SMILING FACE |
| MOUTH SHAPE | I |  | *** | *** |
| GESTURE | NORMAL |  | INCLIMATION 1 | NORMAL |
| PALM POSITION |  |  | (+10,-18.0) |  |

SIGN LANGUAGE EDITING APPARATUS

BACKGROUND OF THE INVENTION

The present invention relates to an apparatus which uses an animation for the sign language to transmit information and specifically to an apparatus for editing animation data for the sign language.

The technique for moving a model of the human body on the computer graphics (CG) from time series data representative of movement of the sign language when the sign language is expressed by the animation on the computer graphics as measures for offering information to an aurally handicapped person is known in "Study in a Method of Producing Animation for the Sign Language using Time Series Data" by Sakiyama et al. in collected papers of the 20-th Meeting of the Japan Sign Language Society.

Heretofore, when the animation for the sign language is edited, time series data for preparing the animation are prepared in a unit of sign language sentence or in a unit of sign language word constituting the sign language sentence and the time series data are combined to produce the animation.

In the former case, re-utilization of the animation data is difficult and accordingly it is uneconomical. Further, in the latter case, re-utilization of the time series data is increased, while it is difficult to add information such as expression and gesture between the sign language words in the sign language sentence.

Furthermore, when the time series data are prepared or when the time series data for the sign language sentence are edited, parameters representative of position, direction and shape of the fingers are modified by directly rewriting values thereof and there is no interface for facilitating such works.

As described above, the technique for effectively preparing the time series data for producing the animation on the computer graphics is not realized yet.

First of all, when the animation data for the sign language are prepared on the basis of data inputted from a glove-type sensor (for example, DATA GLOVE of VPL Research Inc.), the animation data sometimes contain noise which is an obstacle when the data is read as the sign language.

Further, as "red" and "white" of the sign language words, there is a case where whether a mouth pointed by the finger is closed or opened signifies a different sign language word.

Furthermore, as a strange expression made in the interrogative sentence, it is difficult to describe readable or understandable animation data for the sign language from only movement of the fingers inputted from the glove-type sensor.

In addition, there are many sign language words each composed of a combination of several movements of the fingers. It is inefficient to the memory capacity that data for the finger movements are registered individually in respect to the sign language words using the same finger movements and the consistency to correction of the finger movement is also not ensured.

Second, the finger movement data inputted using the glove-type sensor often contain error and correction thereof is required after inputting of the data. At this time, it is inefficient that a numerical value is assigned individually to each frame constituting the time series data to correct it and it is a bottleneck in preparing the animation.

Further, in order to prepare the sign language animation easy to understand, it is also necessary to be able to add information other than the finger movement easily in the same manner as the editing work of the finger movement.

Third, when the whole sign language sentence is expressed in the same rhythm as in expression of the word in the case where the sign language word data are combined to prepare the animation of the sign language sentence, the animation is very difficult to understand. In the actual sign language expression, pauses having different lengths are inserted between words to thereby intonate the actual sign language expression.

Further, the sign language is featured so that the position in which the finger movement is expressed is varied to distinguish persons connected. In order to attain this expression, it is necessary to change the position of the finger movement for the previously registered sign language word data in accordance with the context.

SUMMARY OF THE INVENTION

It is an object of the present invention to provide a sign language editing apparatus for preparing animation data for the sign language easy to understand in accordance with efficient frames expressive of information other than the finger movement.

It is another object of the present invention to provide a sign language editing apparatus capable of easily making correction to incomplete finger movement data and addition of information other than the finger movement.

It is still another object of the present invention to provide a sign language editing apparatus capable of easily performing the correction work required in accordance with the context when animation data prepared for each sign language word are combined to prepare the animation of the sign language sentence.

In order to achieve the above objects, the sign language editing apparatus according to the present invention for performing preparation and editing of time series data for producing the sign language animation while viewing the displayed animation of the sign language by the computer graphics, comprises means for converting movement of the fingers into an electrical signal to input information concerning the finger movement of the sign language as time series data, means for inputting a heading for time series data expressing the finger movement of the sign language, means for performing fine correction with respect to position, direction and shape of fingers to the time series data expressing the inputted finger movement in accordance with instructions by the input means so that finger movement is corrected to be able to view the finger movement naturally as the sign language, means for registering the time series data expressing the corrected finger movement, means for reading out time series data expressing one or more of the registered finger movements constituting sign language word data, means for adding information other than finger movement required to express the sign language word in accordance with instructions by the input means to the read-out time series data and producing the sign language word data constituted by time series data, means for inputting a heading for the sign language word data, and means for registering the produced sign language word data.

Further, the information other than the finger movement includes time series data of the shape of mouth, expression and gesture (movement of the upper body and the head or the like).

Furthermore, the present invention further comprises means for reading out the sign language word data necessary to prepare sign language sentence, means for correcting the time series data of the read-out sign language word data in accordance with instructions inputted by the input means and adding information required when the sign language sentence is expressed exactly to the time series data of the read-out sign language word data to prepare the time series data expressing the sign language for the sentence, means for preserving the time series data for the prepared sign language sentence, means for producing movement of the fingers at the time that the human being uses the sign language as animation by the computer graphics on the basis of the time series data expressing the sign language, and means for displaying the produced animation.

In addition, the means for preparing the time series data expressing the sign language for the sentence adds time series data other than finger movement such as the mouth shape, the expression and the gesture over a plurality of sign language words as the information required when the sign language sentence is expressed exactly in accordance with the instructions inputted by the input means.

Moreover, the means for preparing the time series data expressing the sign language for the sentence changes portion concerning the finger movement of the time series data continuously smoothly in accordance with instructions for correction of the finger movement and designation of the beginning and the end of a certain range of the portion concerning the finger movement of the time series data inputted by the input means so as to smooth the finger movement of the animation in the range.

Further, the means for preparing the time series data expressing the sign language for the sentence changes movement of the sign language of the animation in accordance with instructions for the mouth shape, the expression and the gesture and designation of the beginning and the end of a certain range of the movement of the sign language of the time series data inputted by the input means so as to change movement of the sign language of the animation of the range.

Furthermore, the present invention comprises means for inserting a pause between time series data of the sign language words in accordance with designation of a mark representative of a pause between the sign language words and a length thereof by the input means to intonate the animation expressing the sign language.

In addition, the present invention comprises means responsive to an expansion and contraction ratio and a range of time series data designated by the input means for changing a size of space occupied by loci of the finger movement of the time series data in the designated range in accordance with the designated expansion and contraction ratio.

Moreover, the means for producing the sign language word data selects data concerning the shape of mouth from previously registered samples in accordance with instructions by the input means to thereby add the data concerning the shape of mouth to the time series data to be edited.

Further, the means for producing the sign language word data can select, as a method of assigning the mouth shape data to the time series data, any of methods of adding the mouth shape data to the head of the time series data, adding the mouth shape data to the whole time series data uniformly, adding the mouth shape data to the middle of the time series data, and adding the mouth shape data to the end of the time series data.

Furthermore, the means for producing the sign language word data selects data concerning expression from previously registered samples in accordance with instructions by the input means to thereby add the data concerning expression to the time series data to be edited.

In addition, the means for producing the sign language word data selects data concerning gesture from previously registered samples in accordance with instructions by the input means to thereby add the data concerning gesture to the time series data to be edited.

The animation data for the sign language word can be expressed by the combined finger movements to share the data between the sign language words including the same finger movements so that the memory area can be reduced and to preserve the consistency between the sign language words by correction of the finger movement. Further, when the animation for the sign language sentence is prepared, the expression, mouth shape and gesture data can be designated over a plurality of sign language words to thereby prepare the sign language sentence animation more naturally.

Provision of the interface for facilitating the correction of the animation data can simplify the preparation work of the animation data which is a bottleneck when the sign language is displayed by the animation. In addition, information such as the expression, the shape of mouth and the gesture can be selected from the previously registered data to thereby prepare the sign language animation data simply.

When the sign language word data are combined to prepare the animation for the sign language sentence, the pause can be inserted between the words easily and the sign language word data can be corrected in accordance with the context easily to thereby prepare the understandable sign language animation.

BRIEF DESCRIPTION OF THE DRAWINGS

FIG. 5 shows a format of sign language sentence data;

FIG. 6 shows a format of sign language word data;

FIG. 36 is a diagram illustrating insertion of pause in the sign language sentence data.

DESCRIPTION OF THE PREFERRED EMBODIMENTS

An embodiment of the present invention is now described with reference to FIGS. 1 to 34.

Figure 1:
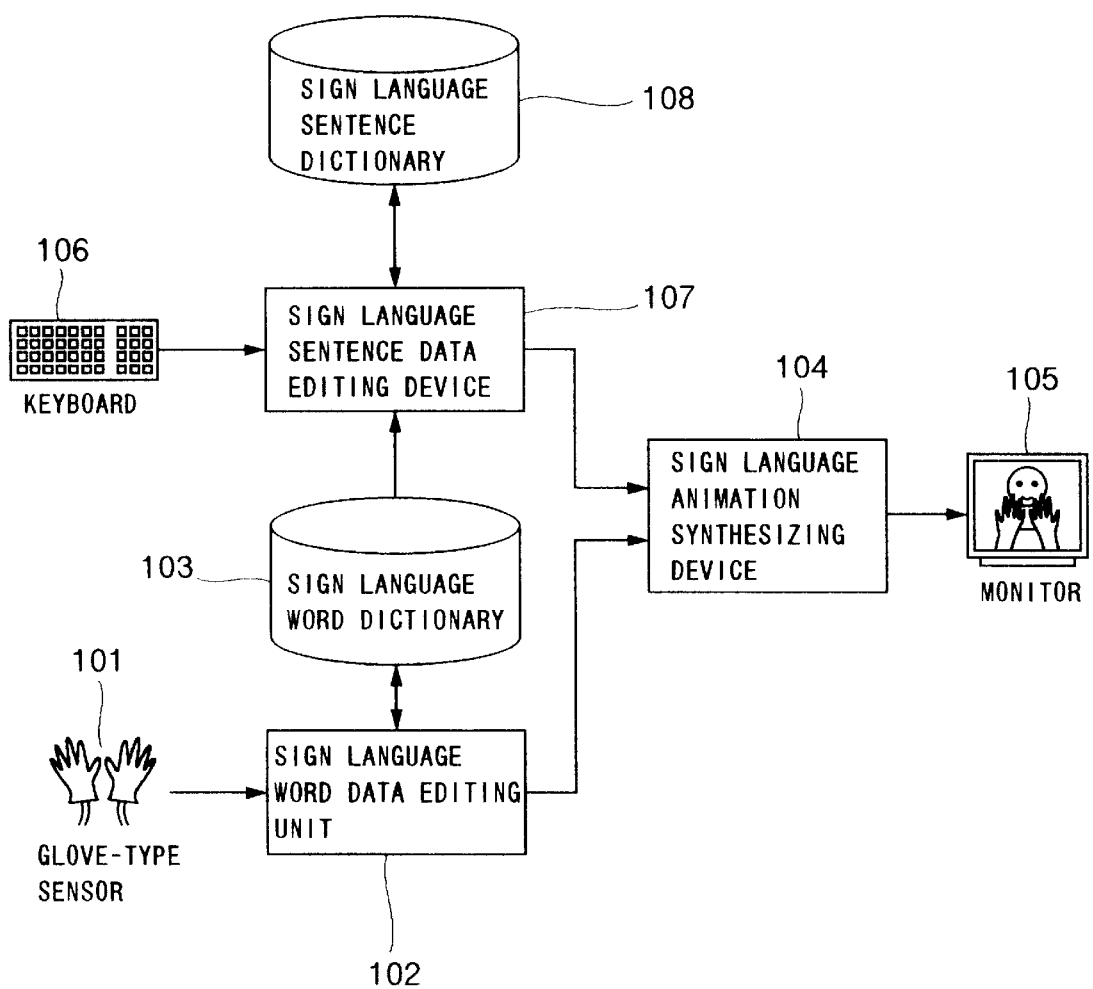
FIG. 1 is a block diagram illustrating the whole configuration of an embodiment of a sign language editing apparatus.

FIG. 1 is a schematic diagram illustrating the whole configuration of an embodiment of the present invention.

Numeral 101 denotes a glove-type sensor for converting movements of the fingers in the sign language into electrical signals to input the signals as time series data when the sign language is expressed by the animation by the computer graphics.

Numeral 102 denotes a sign language word data editing device for correcting data relative to the movement of the fingers inputted in a unit of sign language word by the glove-type sensor 101 and adding information such as expression of the face and the shape of the mouth or the direction of the head and the upper body other than the movement of the fingers to thereby process the time series data so as to easily understand the animation of the sign language.

Numeral 103 denotes a sign language word dictionary for storing the time series data prepared in a unit of sign language word by the sign language word data editing device 102 in order to prepare the animation by the computer graphics.

Numeral 104 denotes a sign language animation synthesizing device for synthesizing a model of the human body of the computer graphics on the basis of the time series data edited in the sign language word editing device to express movement of the sign language.

Numeral 105 denotes a monitor for displaying the animation by the computer graphics of the sign language, and 106 a keyboard for inputting characters.

Numeral 107 denotes a sign language sentence data editing device for taking out the time series data relative to the necessary sign language words from the sign language word dictionary 103 in which the time series data are stored in a unit of sign language word on the basis of arrangement of the sign language words inputted from the keyboard 106 and adding information such as corrected movement of the fingers, expression and the shape of the mouth and movements of the head and the upper body to prepare the time series data for the sign language sentence.

Numeral 108 denotes a sign language sentence dictionary for storing the time series data for the sign language sentence prepared in the sign language sentence data editing device 107.

Figure 2:
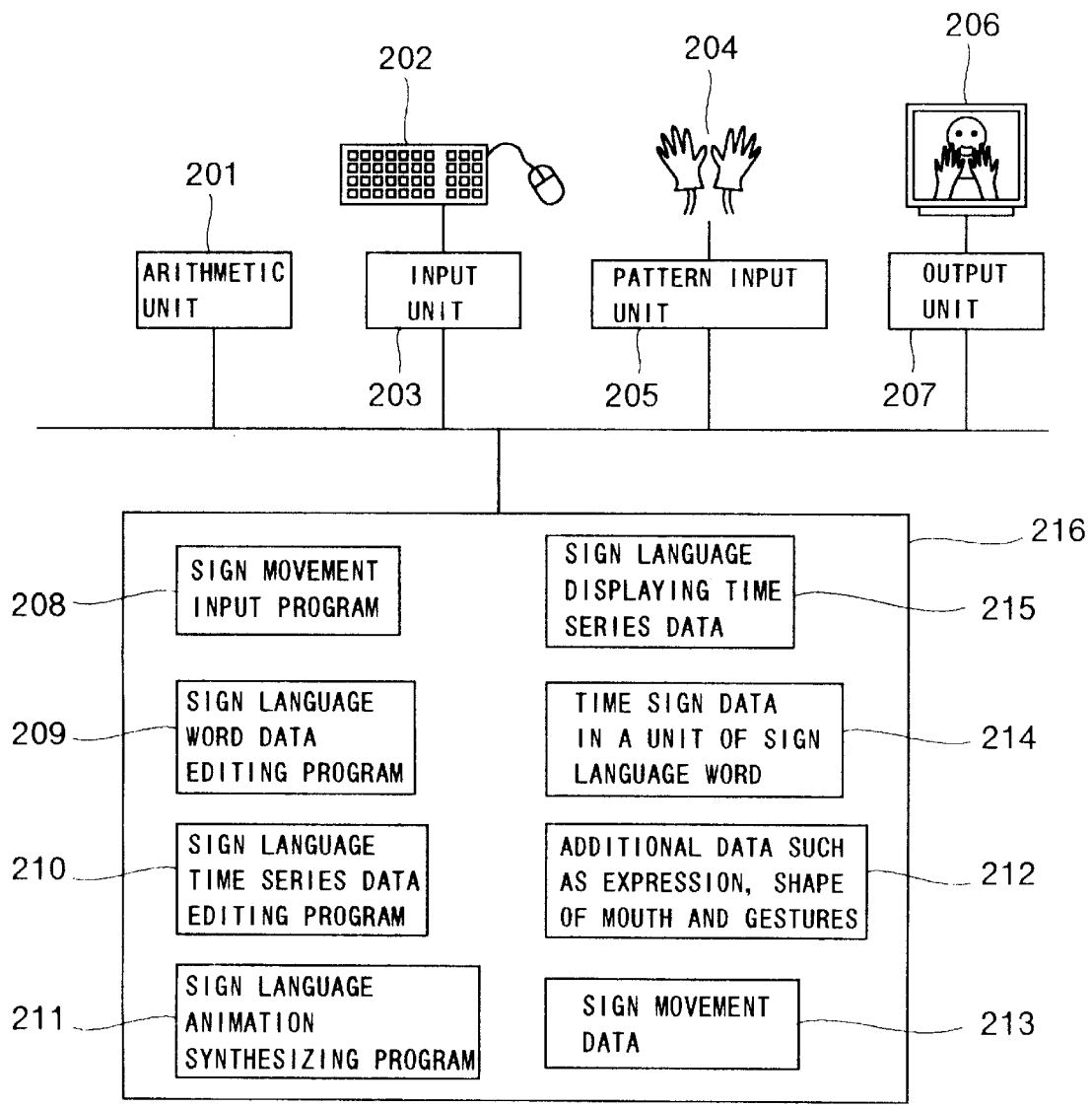
FIG. 2 is a block diagram illustrating the whole configuration of an embodiment of a sign language editing apparatus.

FIG. 2 is a schematic diagram illustrating a hardware of an embodiment of the present invention.

Numeral 201 denotes an arithmetic unit for controlling various programs and performing information processing for preparation of the sign language animation by the computer graphics.

Numeral 202 denotes a keyboard and a mouse for inputting a command to the sign language editing apparatus and a heading given to each sign language word.

Numeral 203 denotes an input unit for interpreting data inputted from the keyboard and the mouse 202 and converting the data into a format readable by the computer.

Numeral 204 denotes a glove-type sensor for inputting movement of the fingers as an electrical signal to the computer, and numeral 205 denotes a pattern input unit for converting the electrical signal inputted from the glove-type sensor 204 into the time series data readable by the computer.

Numeral 206 denotes a monitor for displaying the sign language animation by the computer graphics.

Numeral 207 denotes an output unit for producing the computer graphics data displayed in the monitor 206.

Numeral 208 denotes a finger movement inputting program for controlling the glove-type sensor 204 and the pattern input unit 205 when movement of the fingers is inputted.

Numeral 209 denotes a sign language word data editing program for correcting the time series data relative to the movement of the fingers inputted from the glove-type sensor 204 or adding information other than the movement of the fingers to the time series data relative to the movement of the fingers to prepare the time series data for each sign language word.

Numeral 210 denotes a sign language time series data editing program for editing the computer graphics animation for the sign language sentence by using the time series data for each sign language word prepared by the sign language word data editing program 209.

Numeral 211 denotes a sign language animation synthesizing program for synthesizing a model of the human body of the computer graphics from the time series data prepared by the sign language word data editing program 209 and the sign language time series data editing program 210.

Numeral 212 denotes data relative to the shape of mouth, expression and gesture used when the time series data for the sign language word and the sign language sentence are produced by the sign language word data editing program 209 and the sign language time series data editing program 210.

Numeral 213 denotes time series data relative to the movement of fingers inputted from the glove-type sensor 204 and corrected by means of the sign language word data editing program 209 and stored in the memory.

Numeral 214 denotes time series data in a unit of sign language word which are the stored time series data for each sign language word prepared by the sign language word data editing program 209.

Numeral 215 denotes sign language displaying time series data which are the stored time series data for the sign language sentence prepared by the sign language time series data editing program 210.

Numeral 216 denotes a memory unit in which the programs 208, 209, 210 and 211 and the data 212, 213, 214 and 215 are stored and which corresponds to the sign language sentence dictionary 108 and the sign language word dictionary 103 of FIG. 1.

The glove-type sensor 204 and the pattern input unit 205 can use, for example, a DATA GLOVE and an interface thereof of VPL Research Inc. to attain the function thereof. The glove-type sensor 204 and the pattern input unit 205 are previously used to input the time series data of a predetermined number of sign language words and store the data in the memory area for the time series data 214 so that the data are used for preparation of the sign language sentence later.

Referring now to FIGS. 3 to 10, the time series data for preparation of the sign language animation are described.

Figure 3:
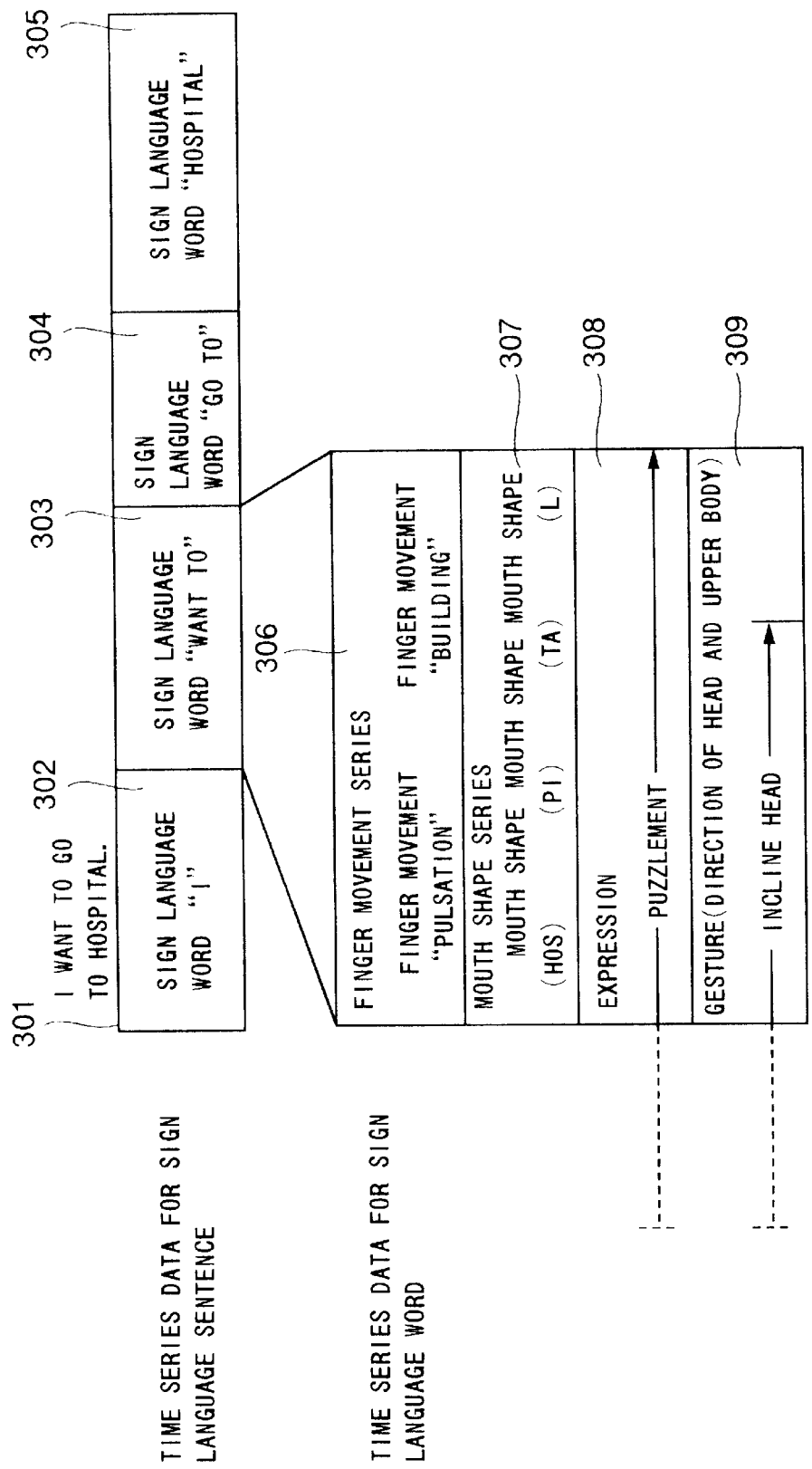
FIG. 3 is a diagram showing a structure of sign language data for preparation of the computer graphics animation.

FIG. 3 shows a relation of the time series data stored in the memory area for the time data series 215 for the sign language sentence and the time series data stored in the memory area for the time series data 214 for the sign language word and contents of the time series data for the sign language word.

Numeral 301 represents data for a sign language sentence of "I want to go to hospital".

Numeral 302 represents a sign language word "I" constituting the data 301, 303 a sign language word "want to", 304 a sign language word "go to", and 305 a sign language word "hospital". These words can be arranged in order of this description to express the sign language sentence of the data 301.

The sign language word is constituted by data of movement of the fingers, a series of shapes of mouth, expression and gesture. The gesture represents movement of the human body other than the fingers, that is, inclination and rotation of the head and the upper body.

In FIG. 3, numeral 306 represents that movement of the fingers constituting the sign language word "hospital" is constituted by a combination of movement of the fingers of the sign language word "pulsation" and movement of the fingers of the sign language word "building".

Numeral 307 represents that movement of the mouth of the animation for the sign language word "hospital" is expressed by a series of shapes of the mouth composed of four shape data of the mouth including "hos", "pi", "ta" and "l".

Numeral 308 represents that expression data of "puzzlement" is assigned or added to the time series data for the sign language word "hospital" over from the previous sign language word "go to" to the sign language word "hospital".

Numeral 309 represents that gesture data of inclination of the head is assigned or added to the time series data for the sign language word "hospital" over from the previous sign language word "go to" to the midway of the sign language word "hospital".

The sign language includes a lot of words, such as the sign language word "hospital" explained in FIG. 3, composed of movements of the fingers representative of a plurality of sign language words ("pulsation" and "building"). It is not efficient that the same data are stored for such sign language words. That is, it is not efficient that the finger movement data of "pulsation" is stored for the sign language word "pulsation", the finger movement data of "building" is stored for the word "building", and the sign language data of "pulsation" and "building" are stored for the word "hospital" because the sign language data are stored in repetition.

Accordingly, the finger movement data are arranged in order in a unit of movement of the fingers having some meaning and the sign language word is expressed by a combination of movements of the fingers.

With respect to the shape of mouth, samples are prepared in a unit of syllable and the samples are selected to prepare the time series data for the sign language word and the sign language sentence.

With respect to the expression and the gesture, sample data are prepared in the same manner as the shape of mouth and the sample data are selected to prepare the time series data for the sign language word and the sign language sentence.

Thus, the user can prepare the time series data for the animation by the computer graphics easily without preparing the additional information such as the shape of mouth, the expression and the gesture from the beginning.

Figure 4:
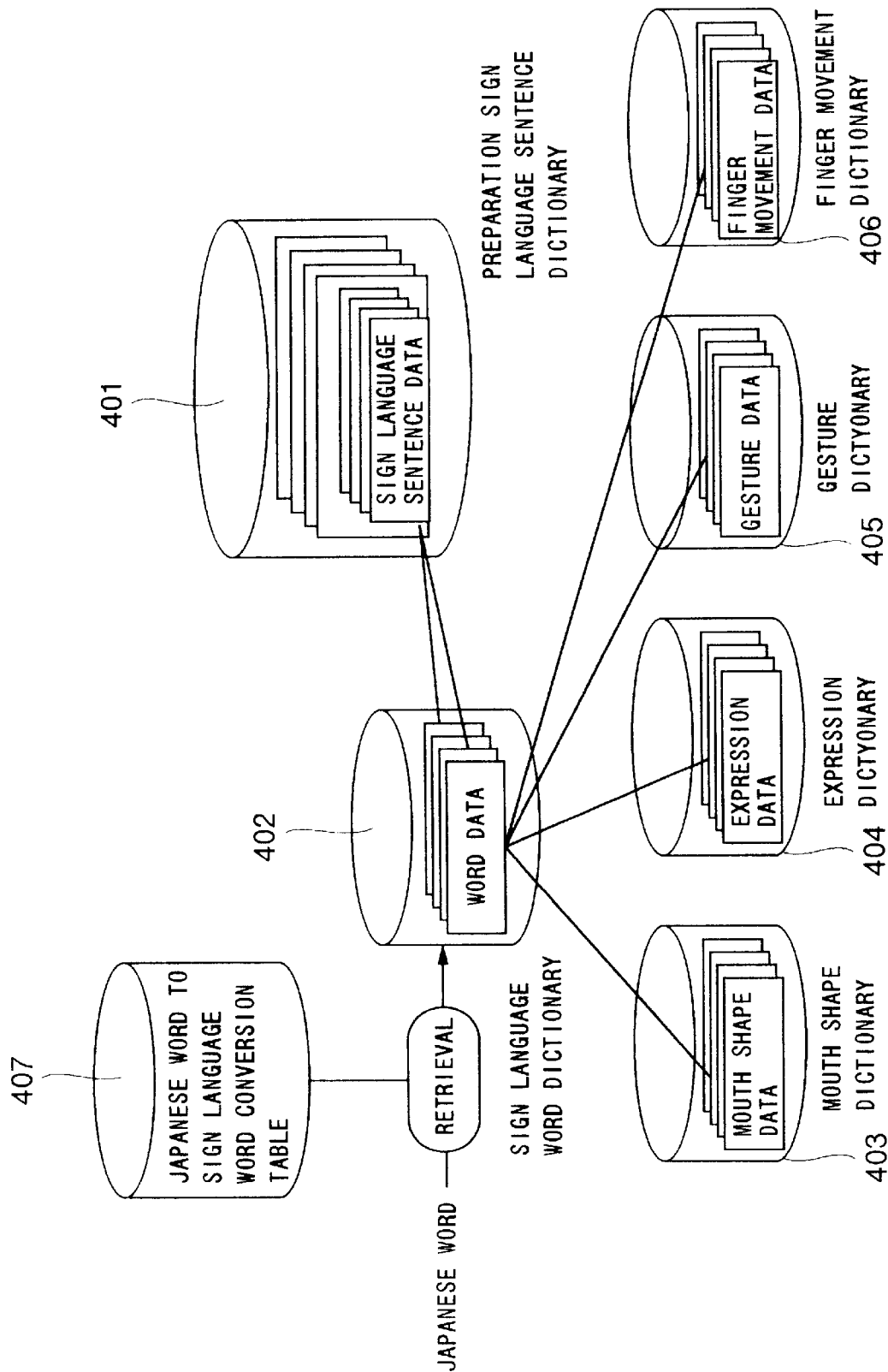
FIG. 4 is a diagram showing a relation among dictionaries in which data for preparation of the computer graphics animation for the sign language are stored.

FIG. 4 schematically illustrates dictionaries for storing data described in FIG. 3 and the relation among the dictionaries. The dictionaries are constituted by the memory unit 216 of FIG. 2.

Numeral 401 denotes a preparation sign language sentence dictionary for storing the time series data for the sign language sentence obtained by adding information concerning the context to a combination of time series data each registered for each sign language word.

Numeral 402 denotes a sign language word dictionary for storing the time series data for each sign language word.

Numeral 403 denotes a mouth shape dictionary for storing mouth shape data expressing the shapes of the mouth used to express movement of the mouth of a model of the human body of the animation.

Numeral 404 denotes an expression dictionary for storing expression data used to express the expression of the face of the human body model of the animation.

Numeral 405 denotes a gesture dictionary for storing gesture data expressing direction and inclination of the head and the upper body used to express movement other than the finger of the human body model of the animation.

Numeral 406 denotes a finger movement dictionary for storing finger movement data expressing movement of the fingers of the human body model prepared by correcting data inputted by means of the glove-type sensor.

The sign language word data are composed of the finger movement data, the mouth shape data, the expression data and the gesture data and the sign language sentence data are expressed by a combination of sign language words.

Numeral 407 denotes a Japanese word to sign language word conversion table for causing Japanese words to correspond to sign language words in headings. For example, in the sign language, when a concept of drink is expressed, it is sometimes expressed as one movement including an objective such as beer and sake. The heading of the sign language word therefor is described by "drink (beer)" and this is caused to correspond to the heading "drink" of the Japanese word.

Referring now to FIGS. 5 to 10, the format of the time series data for preparation of the sign language animation is described.

FIG. 5 shows the format of the time series data for the sign language sentence.

Numeral 501 represents a sign language sentence label given to identify the sign language sentence. Sentences used in certain scenes such as "Operation Guidance of Automatic Ticket Vending Machine" are collected and the sign language sentence label is given in the form of the order that the sentence is positioned in the collected sentences.

Numeral 502 represents Japanese (translated) which describes contents of the sign language sentence in Japanese. Numeral 503 represents a heading of the time series data for the sign language word (for example, "change") constituting the time series data for the sign language sentence. In this case, the heading is "change".

Numeral 504 represents the number of finger movement data constituting the sign language data for the sign language sentence.

Numeral 505 represents headings of the finger movement data at the time when the time series data concerning the finger movements constituting the sign language sentence are arranged in order of appearance in the sign language sentence. For example, when there is a sign language word "hospital" in the sign language sentence, the finger movements constituting the sign language sentence include "pulsation" and "building" and the headings of the finger movement data in this case are "pulsation" and "building", which are determined by designating the sign language word heading 503.

Numeral 506 represents a pointer to mouth shape data expressing information relative to the mouth shape of the time series data for the sign language sentence. Numeral 507 represents a pointer to expression data expressing information relative to the expression of the time series data for the sign language sentence. Numeral 508 represents a pointer to gesture data expressing information relative to the gesture of the time series data for the sign language sentence.

Numeral 509 represents change data for storing changed portions of the time series data concerning the finger movement from the time series data concerning the original finger movement, which occur due to correction of the finger movement dependent on the context after the time series data for the sign language sentence are constituted by designating the sign language word heading 503 and arranging the time series data for the sign language word.

FIG. 6 shows a format of the time series data for the sign language word.

Numeral 601 represents a sign language word heading, numeral 602 represents a Japanese heading expressing a sign language word by a Japanese word corresponding thereto, 603 represents the number of time series data relative to the finger movements constituting the sign language word, numeral 604 represents a finger movement heading describing the finger movement data constituting the time series data of the sign language word in order of appearance thereof, numeral 605 represents a pointer to mouth shape data attendant on the sign language word, numeral 606 represents a pointer to expression data attendant on the sign language word, and numeral 607 represents a pointer to gesture data attendant on the sign language word.

Information capable of being judged from only the sign language word pointers 605 to 607 is described in the pointers 605 to 607 and elements determined by the context are not described therein.

Figure 7:
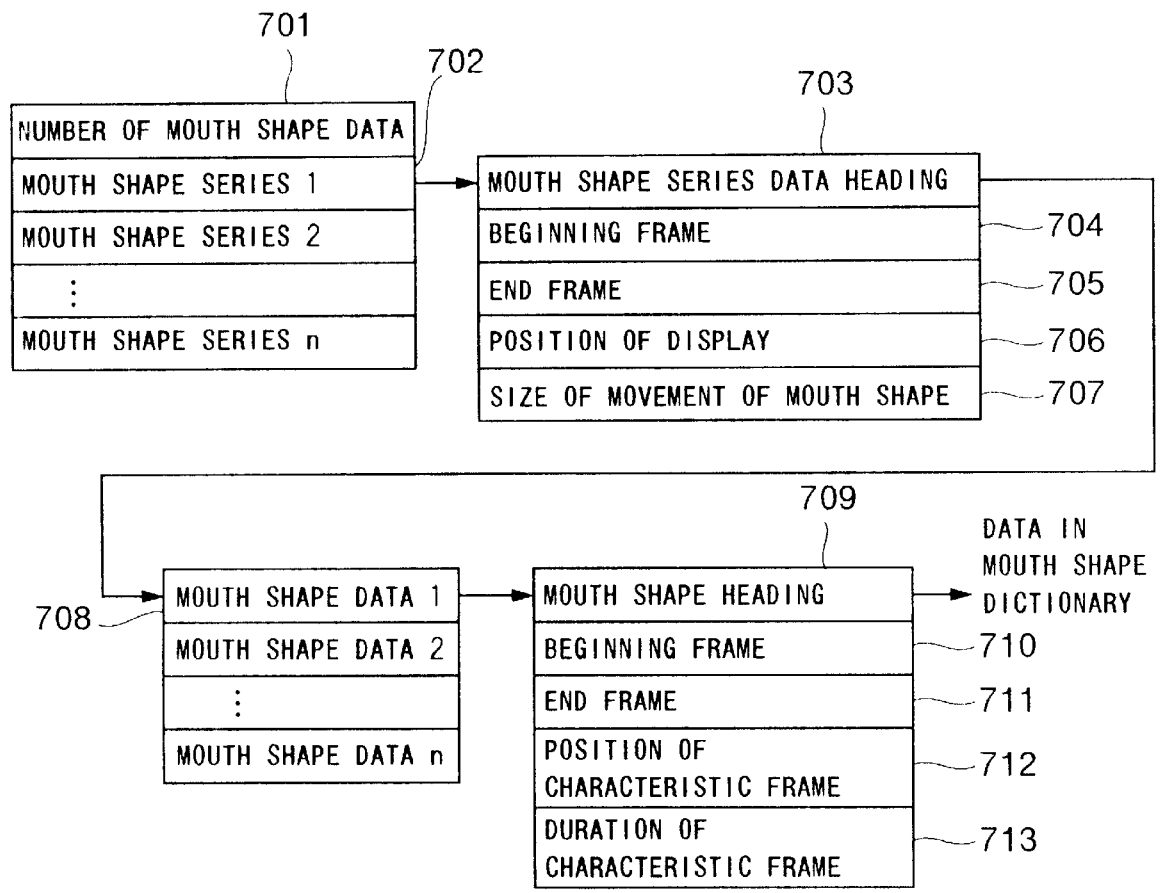
FIG. 7 shows a format of mouth shape series data and mouth shape data.

Referring now to FIG. 7, the expression format of data relative to the shape of mouth is described. This expression format is identical in the sign language sentence and the sign language word and accordingly description is made together.

In the data for the sign language sentence and the sign language word, the mouth shape series data are constituted by the mouth shape data prepared in a unit of syllable such as "byo", "u", "ki" and the mouth shape series data are assigned to some portions of the time series data for the sign language sentence to thereby express the mouth shape.

One mouth shape series data is assigned to the time series data for the sign language word.

Numeral 701 represents the number of mouth shape series assigned to each of the sign language word. In the case of the sign language word, the mouth shape data are assigned to the whole sections thereof and accordingly the number of mouth shape series is 1.

Numeral 702 represents a pointer to mouth shape series data assigned to the sign language sentence and the sign language word actually and numeral 703 represents a heading of the mouth shape series data. Generally, the mouth shape is expressed together in a unit of word such as "hospital" and accordingly the mouth shape series data is provided in corresponding manner to a word.

Numeral 704 represents the number of the beginning frame in the range in which the mouth shape series data are assigned in the time series data for the respective sign language sentence and word, and numeral 705 represents the number of the end frame to which the mouth shape series data are assigned.

Numeral 706 represents how to assign the mouth shape series data to the section designated by the beginning frame number 704 and the end frame number 705 and it is selected that display is made to any of the beginning, the middle, the end and the uniformity as a whole.

Numeral 707 designates the size of movement of the mouth shapes in order to express the difference in movement of the mouth such as quiet movement and emphatical large movement of the mouth.

Numeral 708 represents a pointer to data of the mouth shapes, numeral 709 represents a heading of the mouth shape data prepared in each syllable such as "byo" and "i", numeral 710 represents the number of the head frame in the range in which the mouth shape data are assigned in the time series data for the sign language sentence and word, and numeral 711 represents the number of the end frame in the assigned range.

The mouth shape data includes data of one frame (named a characteristic frame) expressing the characteristic mouth shape and a frame length of default and a range (head and end frames) in which the characteristic frame is assigned in an area having the frame length of default.

Actually, when the time series data for the sign language sentence and word are assigned, the characteristic frame and other portions are continuously varied by means of the interpolation so that smooth movement is attained. Numeral 712 represents the number of the head frame in the range in which the characteristic frame is assigned and numeral 713 represents the frame length of the frame range in which the characteristic frame is assigned.

Figure 8:
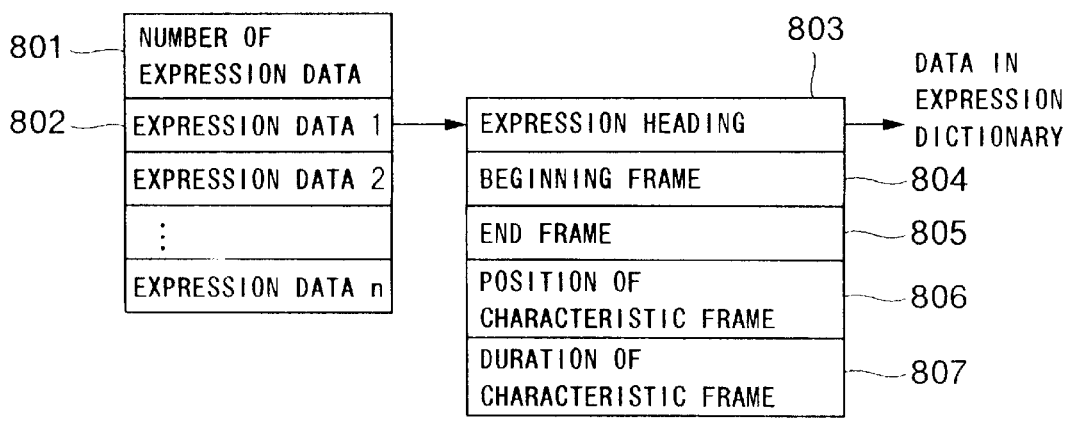
FIG. 8 shows a format of expression data.

Referring now to FIG. 8, the format of the expression data is described. This expression format is identical in the sign language sentence and the sign language word and accordingly description is made together.

Numeral 801 represents the number of expression data constituting expression assigned to the computer graphics animation designated by the pointers 507 and 606 to expression data in the sign language word data and the sign language sentence data. For the sign language word, the number 801 is 1.

Similarly to the mouth shape data, the time series data for the expression data is also prepared so that each portion of the face is moved smoothly by designating the data of one characteristic frame, the range to which expression is added and the range in which the characteristic frame is assigned and interpolating the front and rear portions of the characteristic frame.

Numeral 802 represents a pointer to expression data including data corresponding to one characteristic frame of expression stored in the expression dictionary, numeral 803 represents a heading of expression data, numeral 804 represents the number of the head frame in the range in which expression data are assigned in the time series data, and numeral 805 represents the number of the end frame in the range in which expression data are assigned.

Numeral 806 represents the number of the head frame in which the characteristic frame is assigned in the range in which the expression designated by the frames 804 and 805 is added, and numeral 807 represents the number of frames in the range in which the characteristic frame is assigned.

Figure 9:
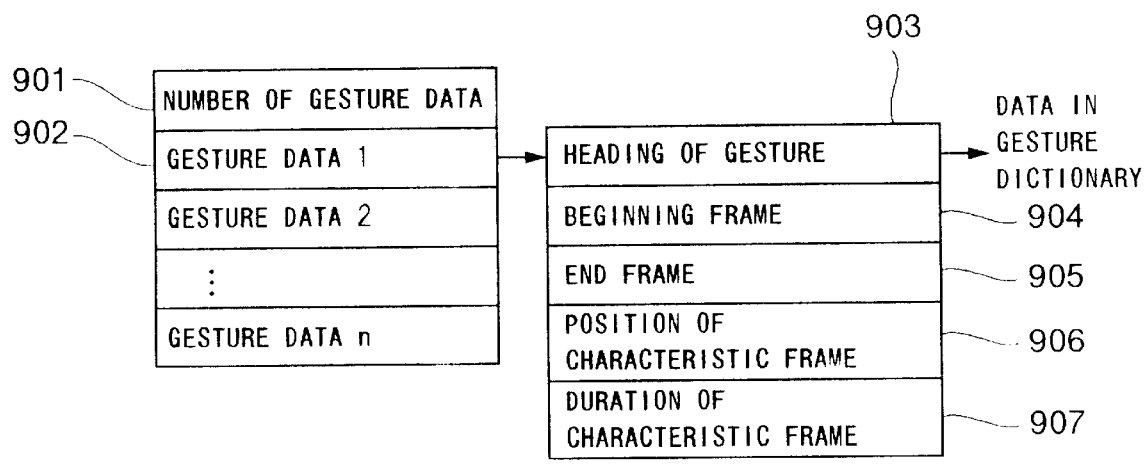
FIG. 9 shows a format of gesture data.

Referring now to FIG. 9, the format of the gesture data is described. This expression format is also identical in the sign language sentence and the sign language word and accordingly description is made together.

The time series data for the gesture data including inclination and rotation of the head and the upper body is also prepared so that each portion of the face is moved smoothly by designating the data of one characteristic frame, the range in which gesture is added and the range in which the characteristic is assigned and interpolating the front and rear portions of the characteristic frame.

Numeral 901 represents the number of gesture data constituting gesture assigned to the computer graphics animation designated by the pointers 508 and 607 to gesture data in the sign language word data and the sign language sentence data. For the sign language word, the number 901 is 1.

Numeral 902 represents a pointer to gesture data including data corresponding to one characteristic frame of gesture stored in the gesture dictionary, numeral 903 represents a heading of gesture data, numeral 904 represents the number of the head frame in the range in which gesture data are assigned in the time series data, and numeral 905 represents the number of the end frame in which gesture data are assigned.

Numeral 906 represents the number of the head frame to which the characteristic frame is assigned in the range in which the gesture designated by the frames 904 and 905 is added, and numeral 907 represents the number of frames in the range in which the characteristic frame is assigned.

Figure 10:
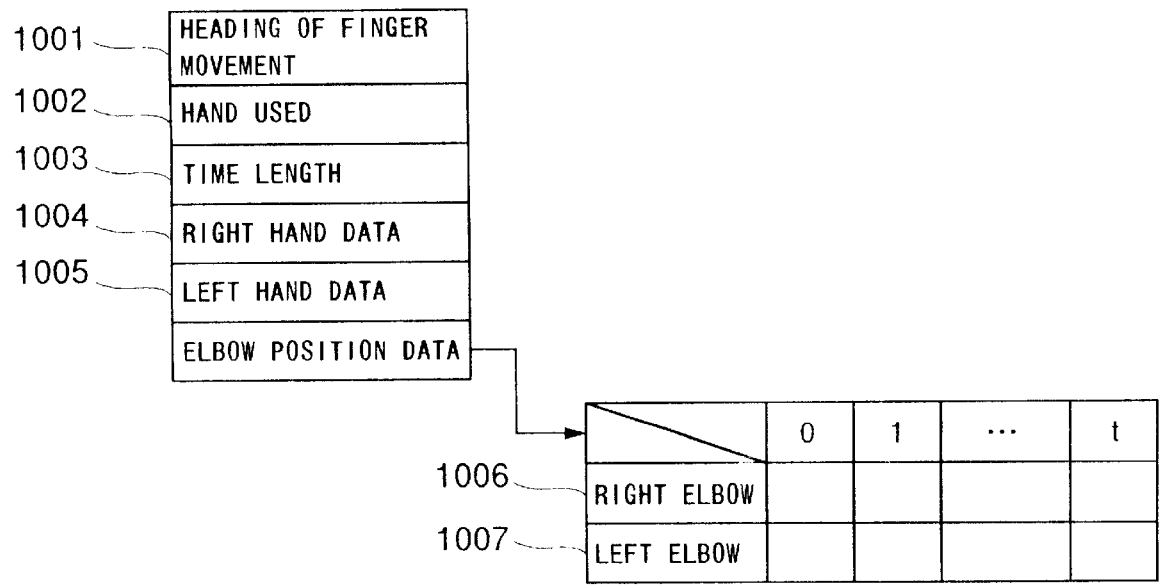
FIG. 10 shows a format of finger movement data.
Figure 11:
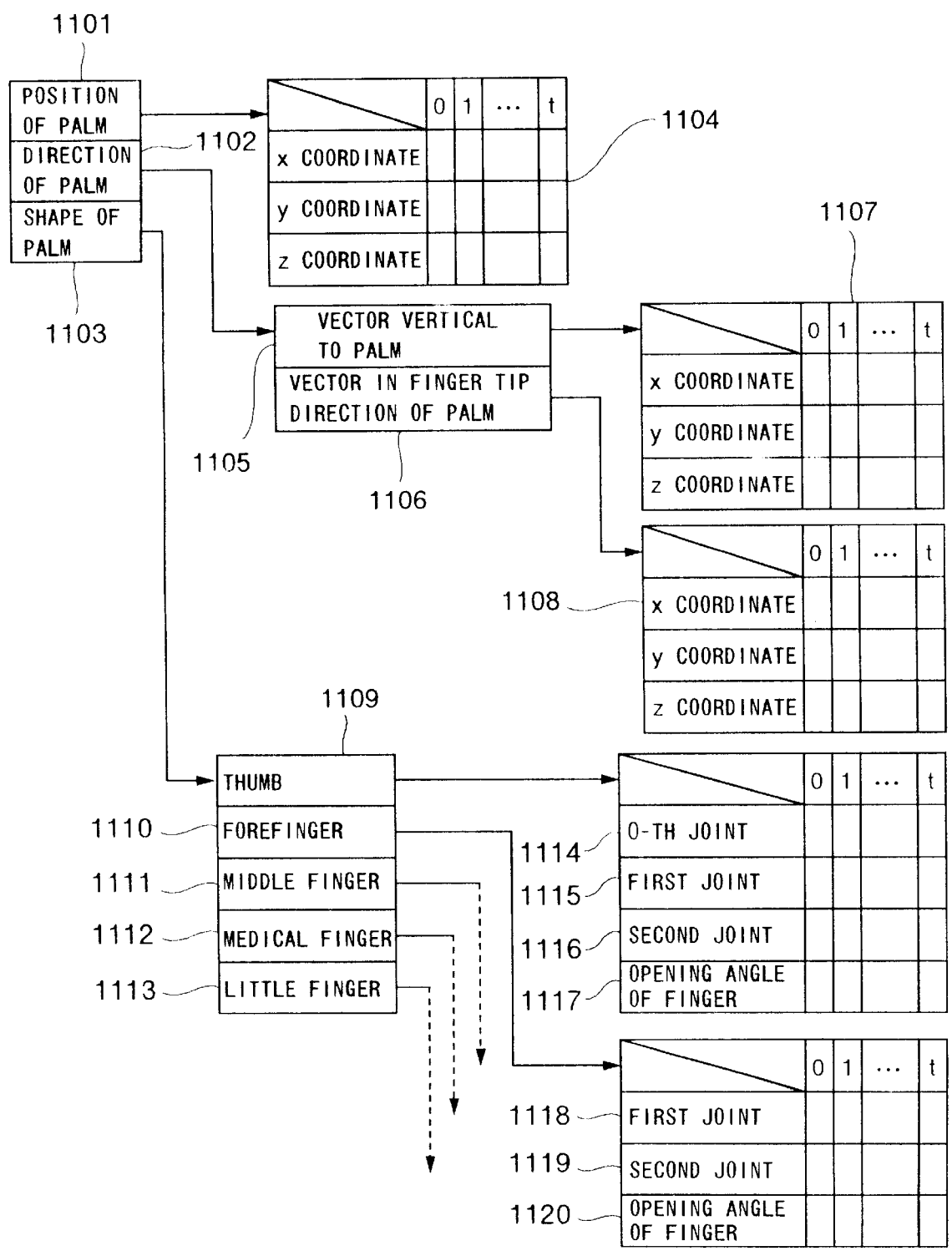
FIG. 11 shows a format of finger movement data in a finger movement dictionary.

Referring now to FIGS. 10 and 11, the format of finger movement data is described.

Numeral 1001 of FIG. 10 represents a heading of finger movement for identifying finger movement data, and numeral 1002 represents a kind of hands used in the finger movement, that is, any of both the hands, the right hand and the left hand.

Numeral 1003 represents of a time length representative of the number of frames constituting the finger movement data, numeral 1004 represents the time series data of finger movement relative to the right hand, and numeral 1005 represents the time series data of finger movement relative to the left hand. These time series data are described in detail with reference to FIG. 11.

Numeral 1006 represents elbow position data representative of an opening angle of the right elbow, and numeral 1007 represents elbow position data representative of an opening angle of the left elbow.

Referring now to FIG. 11, the format of the time series data relative to the finger movement designated by the time series data 1004 and 1005 is described. These data are produced by the glove-type sensor 101 and edited by the sign language word data editing device 102 to be stored in the memory 216 as finger movement data 213.

Numeral 1101 represents data relative to a position of the palm in the three-dimensional space, numeral 1102 represents data relative to a direction of the palm, and numeral 1103 represents data relative to the shape of the palm.

The data 1101 relative to the position of the palm are expressed by describing the position of the palm at a certain time by coordinate values on the three-dimensional coordinate axes x, y and z and arranging the coordinate values successively as shown by time series data 1104.

The data 1102 relative to the direction of the palm include a vector 1105 vertical to the plane of the palm and a vector 1106 on the plane of the palm, and both the vectors are expressed by three-dimensional vector data of x, y and z as shown by 1107 and 1108.

The data 1103 relative to the shape of the palm include data expressing the thumb 1109, the forefinger 1110, the middle finger 1111, the medical finger 1112 and the little finger 1113. The data 1109 of the thumb are expressed by a bending angle 1114 of the root or base (named the 0-th articulation or joint) of the thumb, a bending angle 1115 of the first articulation of the thumb, a bending angle 1116 of the second articulation of the thumb and an opening angle 1117 in the same plane as the palm of the thumb.

The data 1110 of the forefinger are expressed by the time serial data including a bending angle 1118 of the first articulation of the forefinger, a bending angle 1119 of the second articulation of the forefinger and an opening angle 1120 of the finger in the palm plane.

The data of the middle finger, the medical finger and the little finger are also expressed by the time serial data in the form of from 1118 to 1120 in the same manner as the forefinger.

Figure 12:
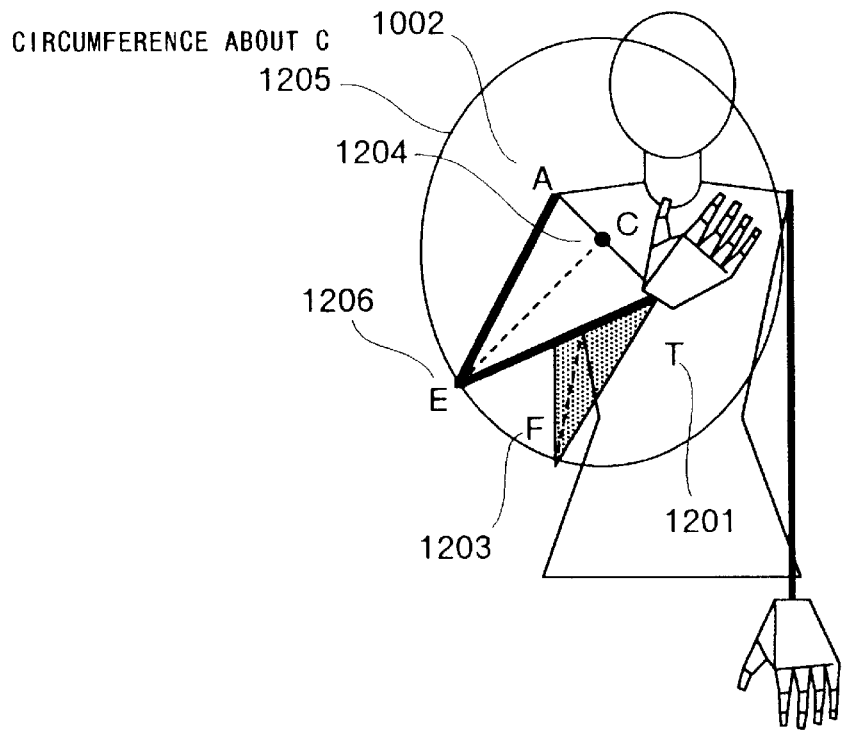
FIG. 12 is a diagram illustrating a calculation method of a position of the elbow.

FIG. 12 illustrates an opening angle of the elbow.

It is assumed that a position of the palm at a certain time is T 1201 and positions of the shoulder and the elbow are A 1202 and F 1203, respectively.

When it is assumed that a middle point of the position A of the shoulder and the position T of the palm is C 1204, it is assumed that the position E 1206 can move on the circumference 1205 having a radius of a line CF and included in a plane vertical to a line AT and an angle ECF at this time is the opening angle of the elbow. The angle ECF is varied to adjust the position of the elbow in the computer graphics animation.

Figure 13:
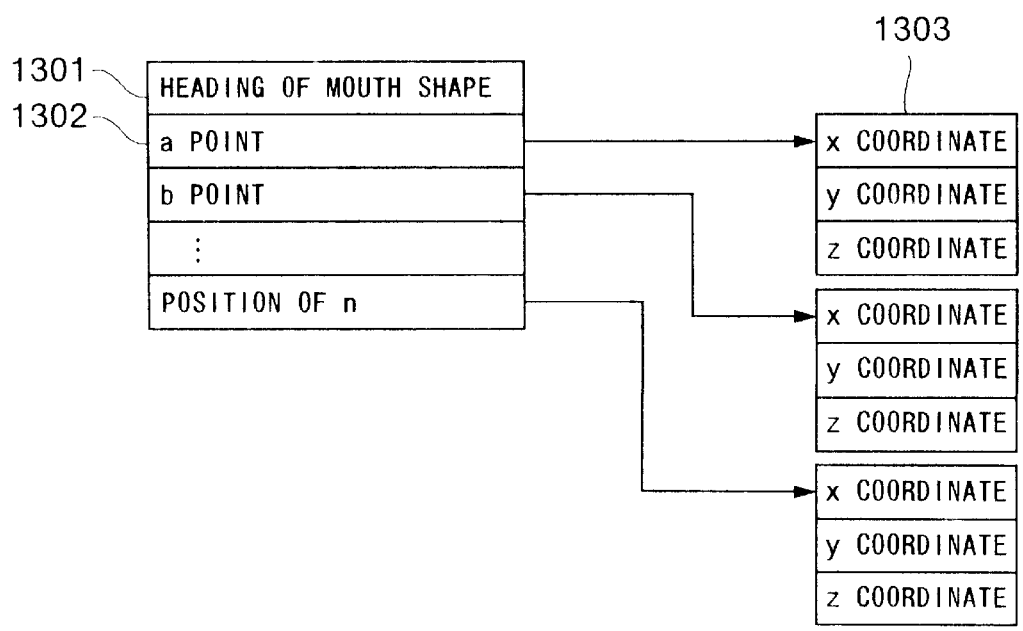
FIG. 13 shows a format of mouth shape frame data in a mouth shape dictionary.

FIG. 13 shows a format of the mouth shape data in the mouth shape dictionary.

Numeral 1301 represents a heading of mouth shape for identifying mouth shape data prepared in a unit of syllable such as "a", "ba" and "gya".

In order to express the shape of mouth as the computer graphics animation, some points in an area of lips are extracted as characteristic points and data for one frame are prepared by combining coordinates of the characteristic points. Numeral 1302 represents data relative to the characteristic points, which are expressed by coordinates on the three-dimensional coordinate axes x, y and z as shown by 1303.

Figure 14:
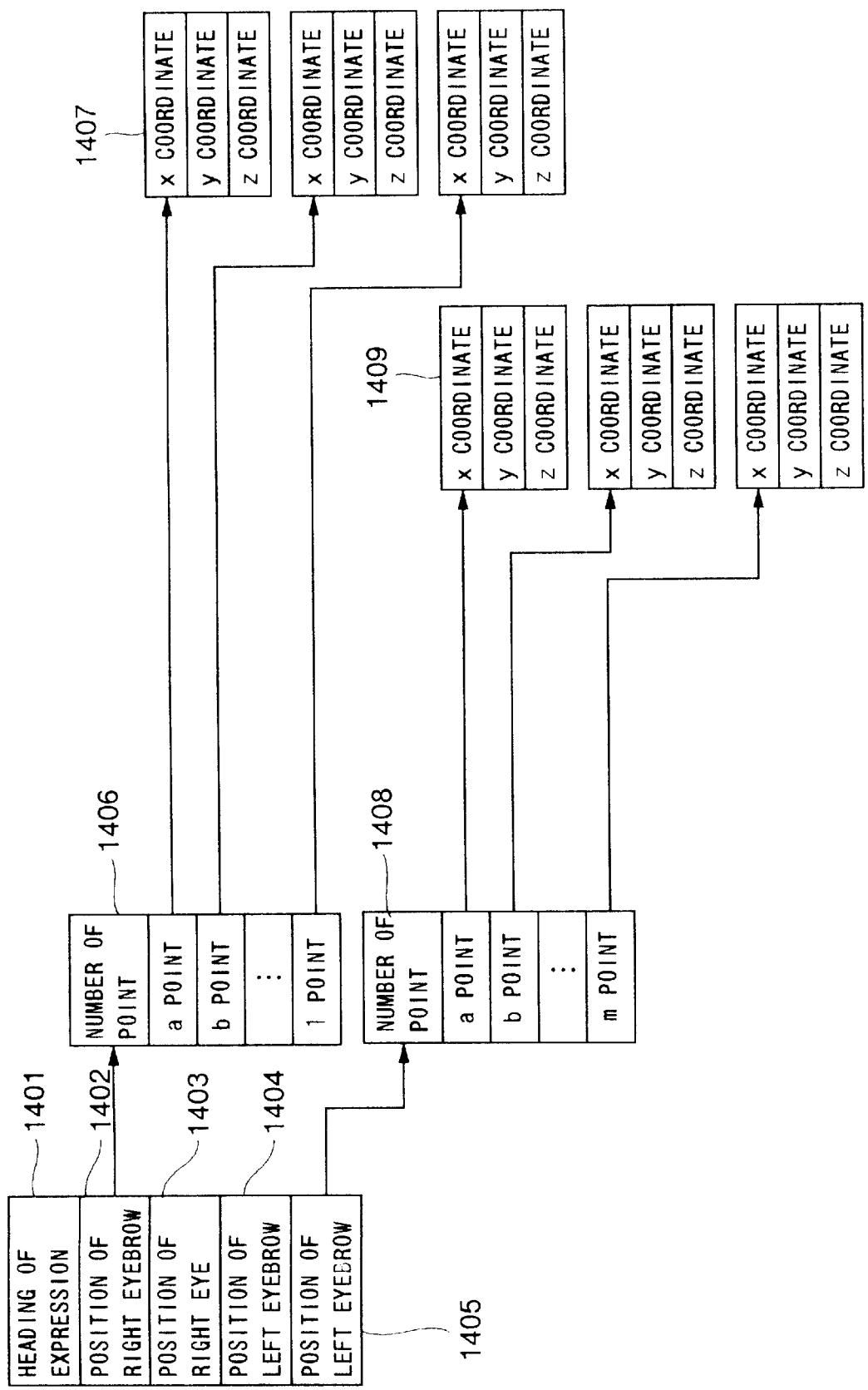
FIG. 14 shows a format of expression frame data in an expression dictionary.

FIG. 14 shows a format of expression data in the expression dictionary.

The expression data for preparing the computer graphics animation are expressed by respective positions of the right and left eyebrows and eyes. Numeral 1401 represents a heading of expression for identifying the expression data prepared in a unit of expression such as a smiling face and an angry face.

Numeral 1402 represents data relative to a position of the right eyebrow, numeral 1403 represents data relative to a position of the right eye, numeral 1404 represents data relative to a position of the left eyebrow, and numeral 1405 represents data relative to a position of the left eye. In order to express the expression in the computer graphics animation, some points in an area of the eyebrows and the eyes are extracted as characteristic points and data for one frame are prepared by combining coordinates thereof.

Numeral 1406 represents the number of characteristic points of the eyebrow necessary to express the data 1402 relative to the position of the right eyebrow, and the characteristic points are expressed as values 1407 on the three-dimensional coordinate axes x, y and z.

Similarly, the data 1405 relative to the position of the left eye are expressed by the number 1408 of characteristic points for expressing the eye and values 1409 on the three-dimensional coordinate axes x, y and z of the characteristic points.

Figure 15:
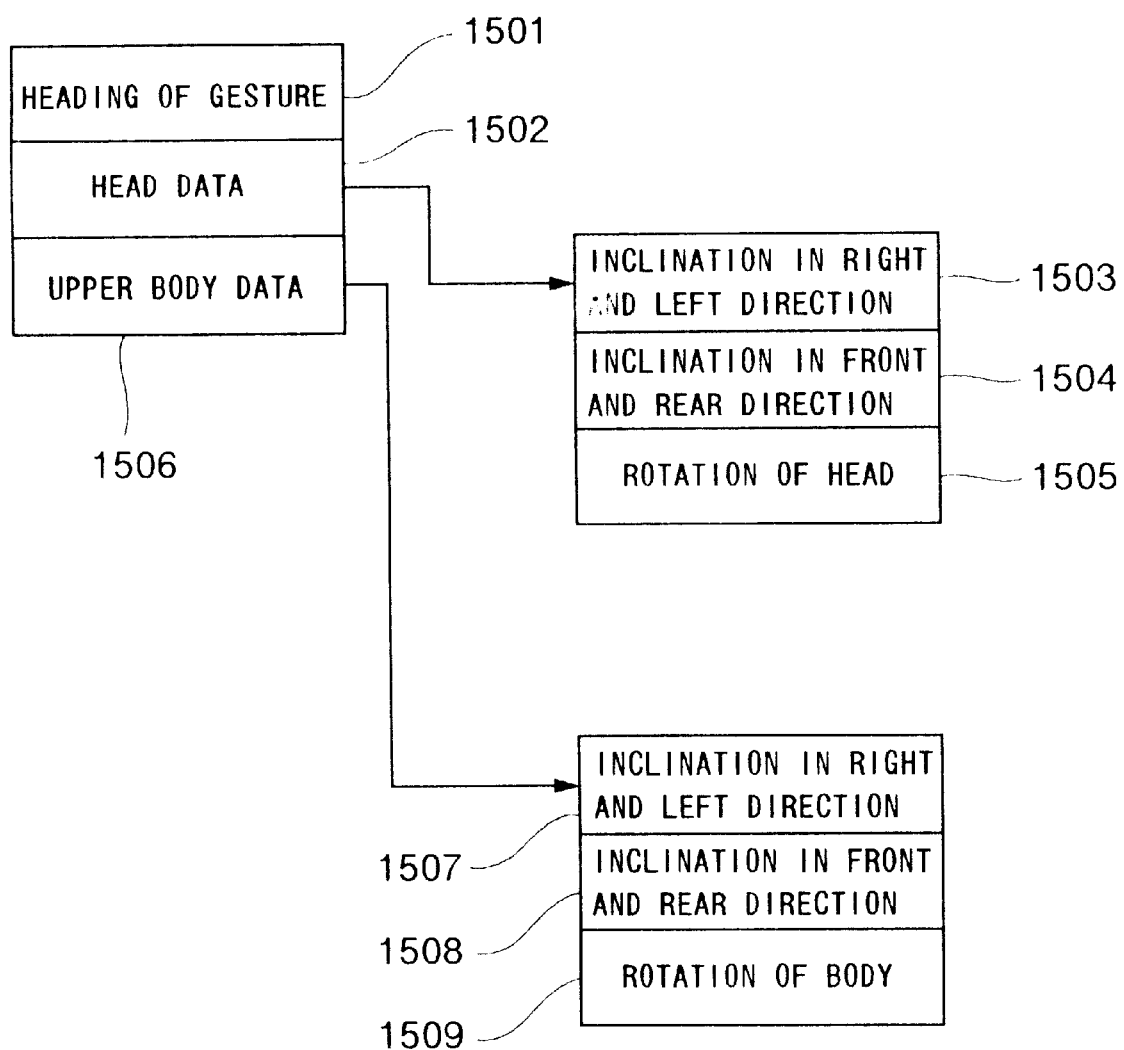
FIG. 15 shows a format of gesture data in a gesture dictionary.

FIG. 15 shows a format of gesture data in the gesture dictionary.

Numeral 1501 represents a heading of gesture for identifying gesture data. The gesture data are constituted by data relative to directions and angles of the head and the upper body.

Numeral 1502 represents data relative to inclination and rotation of the head, and the data 1502 are expressed by an inclination angle 1503 in the right and left direction of the head, an inclination 1504 in the front and rear direction of the head and a rotation angle 1505 of the head.

Numeral 1506 represents a heading of data relative to the upper body, and the data are expressed by an inclination angle 1507 in the right and left direction of the upper body, an inclination angle 1508 in the front and rear direction of the upper body and a rotation angle 1509 of the upper body.

Sample data of the expression data, the mouth shape data and the gesture data of the above data previously prepared in the expression dictionary, the mouth shape dictionary and the gesture dictionary can be selected by the user to prepare the animation data.

Figure 16:
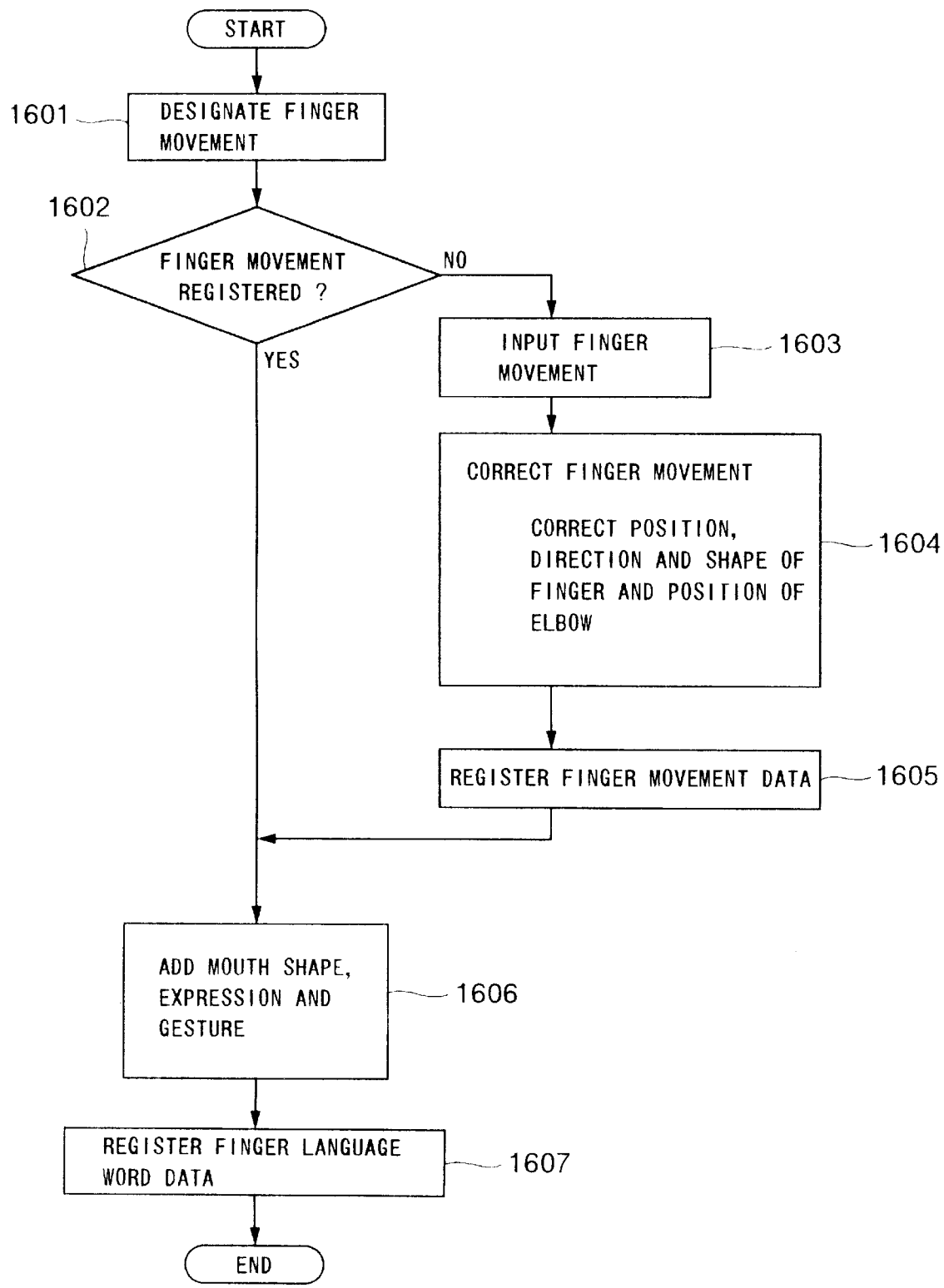
FIG. 16 is a flow chart showing a procedure for preparing sign language word data.

Referring now to FIG. 16, the procedure for causing the user to prepare the time series data relative to the sign language word registered for each sign language word is described.

In order to prepare the sign language word data, the finger movement constituting the sign language word is first read out from the dictionary or prepared newly to be designated (step 1601). When the sign language word of, for example, "hospital" is prepared, the finger movement meaning "pulsation" and the finger movement meaning "building" are designated to thereby describe data relative to the finger movement of the sign language word "hospital".

Whether the time series data relative to the finger movement designated in step 1601 is registered in the finger movement dictionary or not is examined (step 1602).

When the finger movement data is not registered in the finger movement dictionary, the finger movement is inputted by the glove-type sensor 101 (step 1603) and the inputted finger movement data are corrected with respect to the position of the finger, the direction of the finger, the shape of the finger and the position of the elbow (step 1604). The resultant finger movement data are stored in the finger movement dictionary together with the heading (step 1605).

When the finger movement designated in step 1602 has been registered and after the finger movement data has been registered in the finger movement dictionary in step 1605, information relative to the mouth shape, the expression and the gesture is added by selecting data from the respective dictionaries (step 1606) and the resultant sign language word data is registered in the sign language word dictionary (step 1607).

As described above, the time series data relative to the sign language word are prepared in a unit of finger movement. The editing work in this case is made while the animation is displayed during the editing and the edited result is confirmed.

Figure 17:
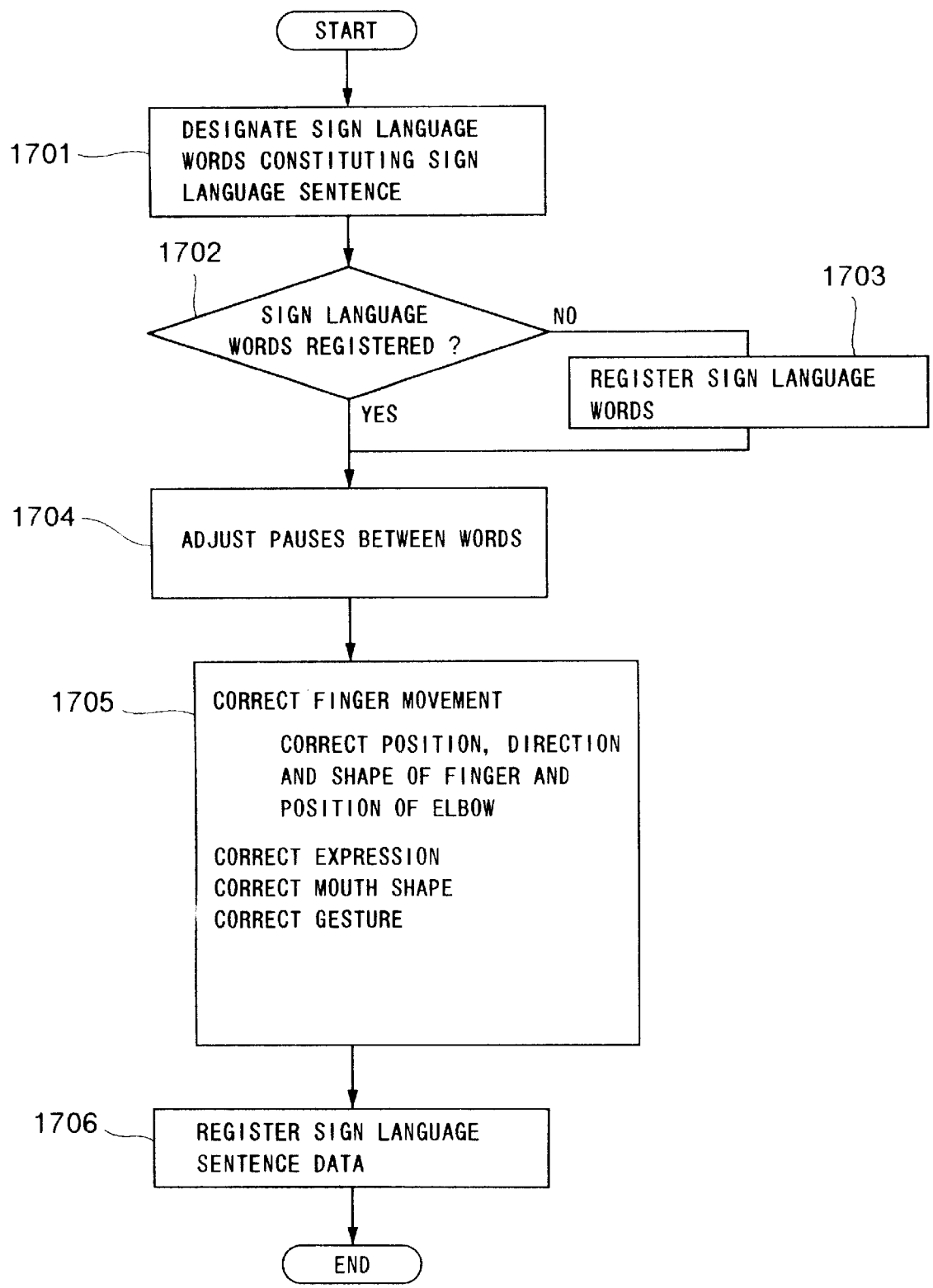
FIG. 17 is a flow chart showing a procedure for preparing sign language sentence animation data.

Referring now to FIG. 17, the procedure for causing the user to edit the animation data of the sign language sentence is described.

The user first designates the sign language words constituting the sign language sentence (step 1701).

Whether the time series data for the headings of the sign language words designated in step 1701 are registered in the sign language word dictionary or not is then examined (step 1702).

When the time series data for the sign language words are not registered in the sign language word dictionary, the sign language words are registered (step 1703). The registration of the sign language word data is made by the method described in FIG. 16.

In step 1702, when the time series data relative to the sign language words are registered or after the time series data relative to the sign language words have been registered in step 1703, pauses are inserted in portions required between the sign language words in the animation (step 1704).

Insertion of the pauses between the sign language words can intonate the animation and prepare the readable or understandable computer graphics animation of the sign language as compared with simple arrangement of the time series data prepared for each sign language word.

Further, the data registered for each sign language word are modified with respect to finger movement, expression, mouth shape and gesture in accordance with the context (step 1705).

The sign language sentence data resulted from the work performed until step 1705 are stored in the preparation sign language sentence dictionary (step 1706). The editing work in this case is made while the animation is displayed during the editing and the edited result is confirmed in the same manner as upon editing of the sign language word data. Editing of the time series data for the sign language animation described above is described below.

Referring now to FIGS. 18 to 32, the editing work of the time series data for the sign language words is described.

Figure 18:
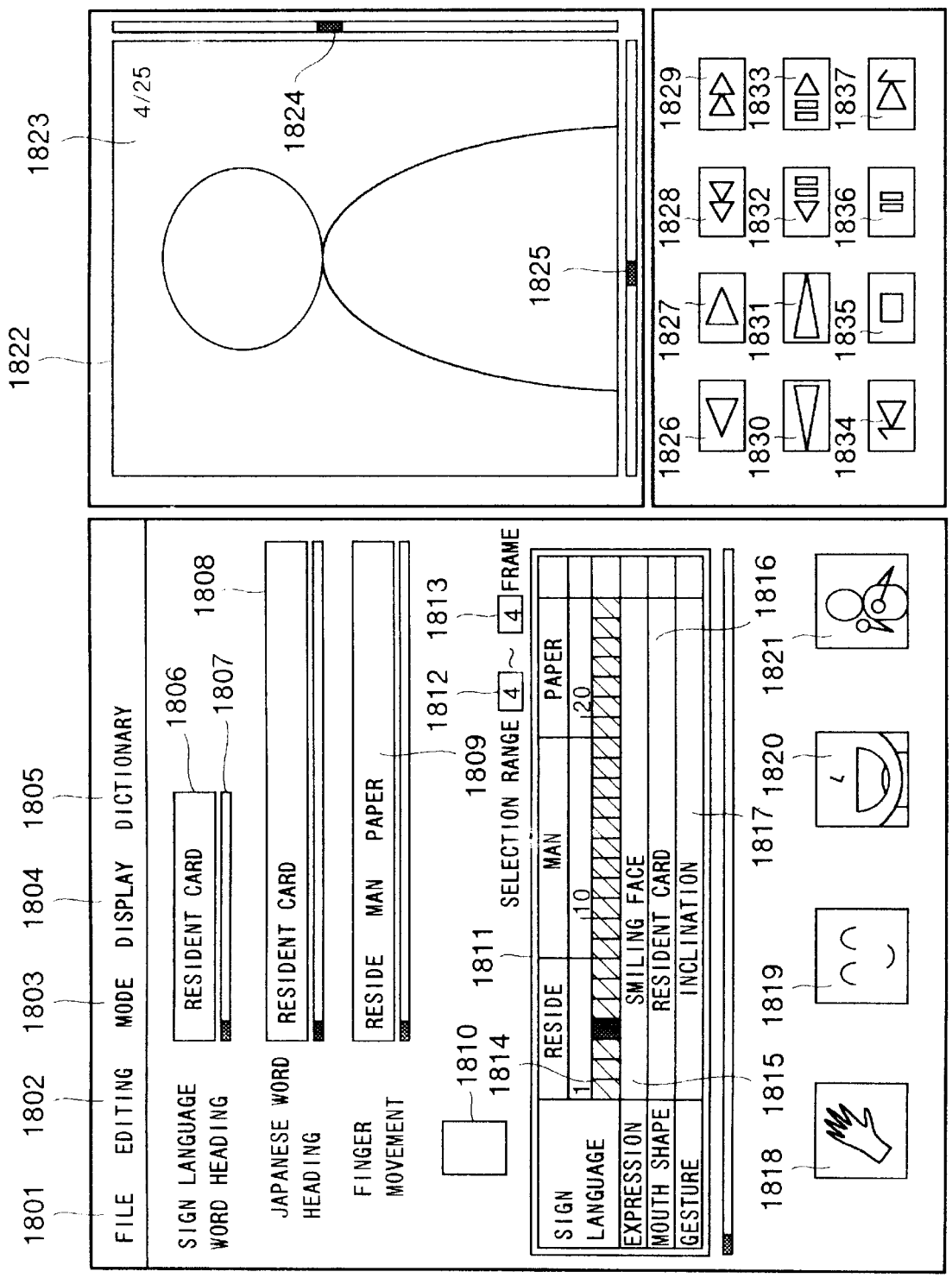
FIG. 18 shows a sign language word data editing picture.

FIG. 18 shows an example of an editing picture of the sign language word data.

Numeral 1801 represents a file pull-down menu for calling the time series data for the sign language word onto the editing picture, storing the time series data in the sign language word dictionary or the like.

Numeral 1802 represents an editing pull-down menu for performing cutting, pasting, interpolation of movement, adjustment of display speed, compression and expansion of movement and the like for the time series data relative to the finger movement, specifically, of the time series data for the sign language words.

Numeral 1803 represents a mode pull-down menu for switching editing of the time series data for the sign language word and editing of the time series data for the sign language sentence.

Numeral 1804 represents a display pull-down menu for designating whether parameter values relative to position, direction and shape of the finger are displayed together with the sign language animation or not.

Numeral 1805 represents a dictionary pull-down menu for selecting a dictionary in which the time series data for the edited result are registered.

Numeral 1806 represents a display column for the sign language word heading in which the heading 601 of the sign language word to be edited is inputted and displayed. When a knob or handle 1807 is moved right and left, the sign language word heading 1806 is scrolled right and left in response to the movement thereof.

Numeral 1808 represents a display column for the Japanese word heading in which the Japanese heading 602 (FIG. 6) for the sign language word is inputted and displayed. Numeral 1809 represents a display column for the finger movement heading in which the finger movement headings 604 constituting the time series data for the sign language word to be edited are inputted and displayed in order of construction or arrangement thereof.

Numeral 1810 represents a button for retrieving the finger movement data for the finger movement heading inputted in the display column 1809 from the finger movement dictionary. This retrieval corresponds to the operation in step 1602 (FIG. 16).

Numeral 1811 represents a sign language word basic information table for displaying information relative to finger movement, expression, mouth shape and gesture constituting the sign language word. Information relative to the sign language word obtained as a result of the retrieval by the button 1810 is displayed in the table 1811.

Numerals 1812 and 1813 represent the numbers of the beginning frame and the end frame, respectively, when frames in a certain section are selected in the editing work.

Numeral 1814 represents a frame indicator used when a frame in a certain section is selected in the editing work. When a frame is selected by the user, a portion corresponding to the selected frame is reversely displayed.

The expression heading assigned as expression data is displayed in area 1815, the mouth shape heading assigned as mouth shape data is displayed in area 1816, and the gesture heading assigned as gesture data is displayed in area 1817.

Numeral 1818 represents a finger movement editing button for correcting finger movement data relative to a frame selected by depressing the button 1818 after a certain frame section is selected in 1814.

Numeral 1819 represents an expression editing button for editing expression data by depressing the button 1819 after a certain frame section is selected in 1814.

Numeral 1820 represents a mouth shape editing button for editing the shape of mouth by depressing the button 1820 after a certain frame section is selected in 1814.

Numeral 1821 represents a gesture editing button for editing gesture data by depressing the button 1821 after a certain frame section is selected in 1814.

Numeral 1822 represents a sign language animation display window for displaying the sign language animation. Numeral 1823 represents an indicator indicating the number of whole frames constituting the time series data for the sign language word and a position of the frame displayed currently. Numeral 1824 represents a knob or handle for changing the direction of the displayed sign language animation in the vertical direction. Numeral 1825 represents a knob or handle for changing the displayed sign language animation in the horizontal direction.

Numeral 1826 represents a button for reproducing the sign language animation in the reverse direction, 1827 a button for starting reproduction of the sign language animation, 1828 a button for reproducing the sign language animation in the reverse direction at a double speed, 1829 a button for reproducing the sign language animation in the forward direction at a double speed, 1830 a button for reproducing the sign language animation in the reverse direction at a half speed, 1831 a button for reproducing the sign language animation in the forward direction at a half speed, 1832 a button for reproducing the sign language animation in the reverse direction by one frame, 1833 a button for reproducing the sign language animation in the forward direction by one frame, 1834 a button for moving the sign language animation to the beginning frame, 1835 a button for stopping reproduction of the sign language animation, 1836 a button for interrupting reproduction of the sign language animation, and 1837 a button for moving the sign language animation to the end frame. Such pictures are used to edit the sign language word data.

Figure 19A:
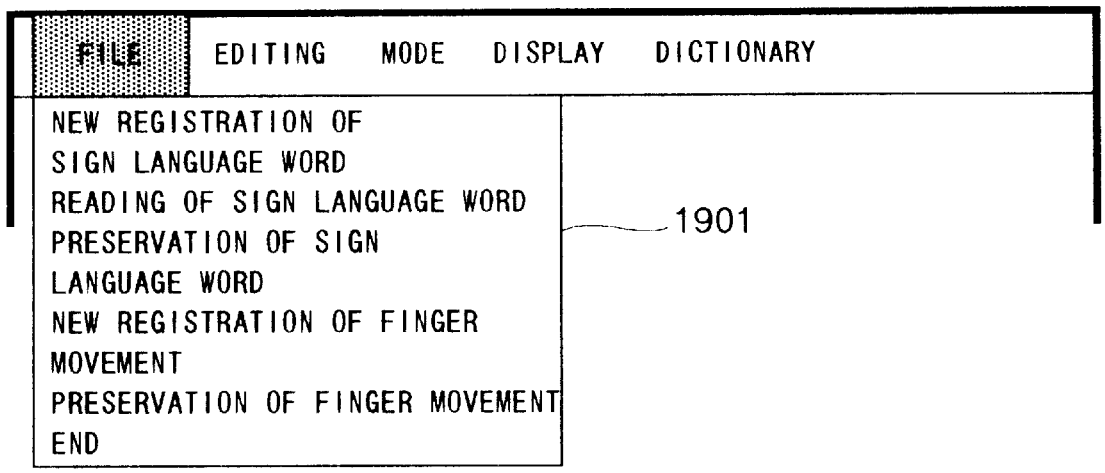
FIGS. 19A and 19B show a finger movement data input picture.

Referring now to FIG. 19, inputting of finger movement in step 1603 (FIG. 16) is described.

Figure 19B:
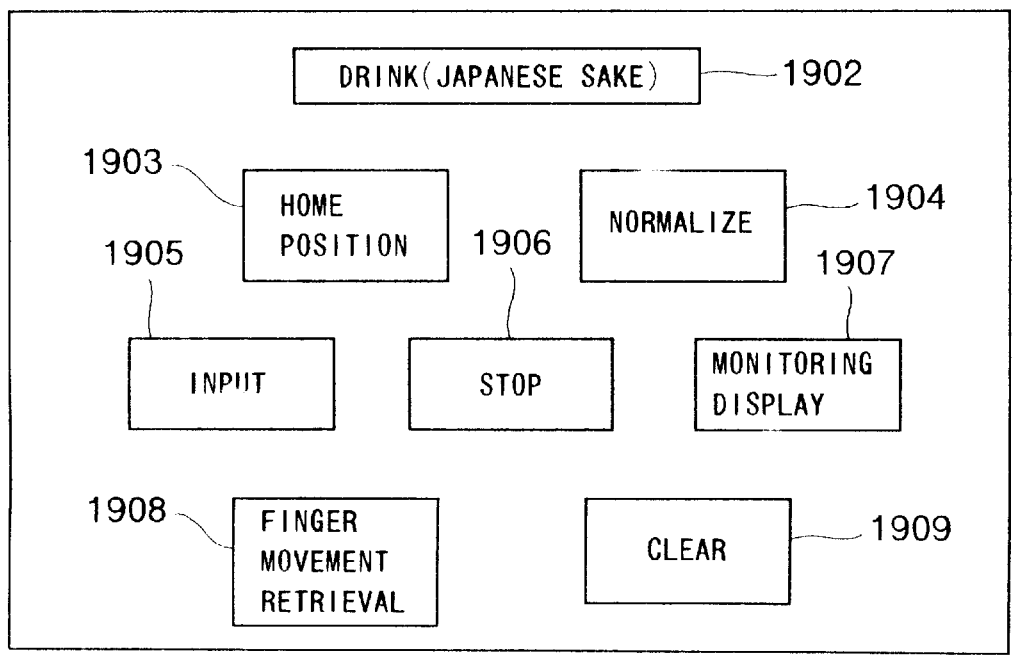

New registration of finger movement is selected (1901) from the file menu 1801 to thereby display a finger movement input window of FIG. 19B. Numeral 1902 represents a display column of finger movement heading for displaying the finger movement heading. The finger movement heading inputted in the display column 1809 is displayed in the display column 1902.

When the glove-type sensor is used to input finger movement, a specific position (home position) is previously designated and one finger movement until the finger is returned to the home position after the finger begins to move from the home position is gathered.

Numeral 1903 represents a home position button for designating a position of the finger used as the beginning and the end for gathering data when the finger movement is inputted. The position of the finger at the time that this button is depressed is a position for performing the function of switch.

Numeral 1904 represents a normalizing button used when information relative to a size of the body of a finger movement registration person is inputted in order to correct a deviation of the relative positional relation between the finger and the body caused by a difference of the size of the body of the finger movement registration person equipped with the glove-type sensor.

Figure 20:
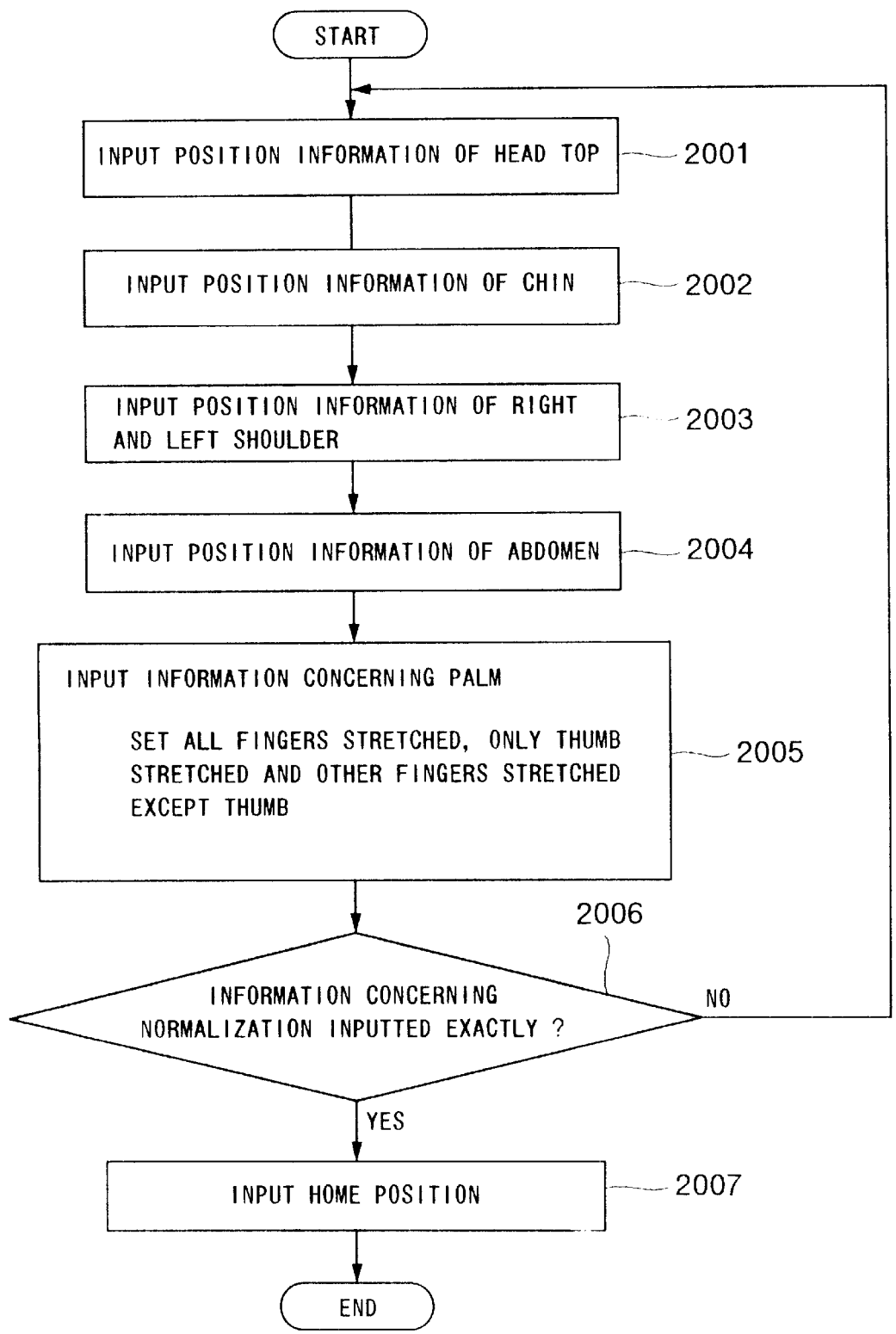
FIG. 20 is a flow chart showing a procedure for inputting positional information of the human body of a finger movement input person.

Referring now to FIG. 20, the normalizing process is described. The top of the head is indicated by the finger equipped with the glove-type sensor to thereby input the relative positional relation of the top of the head and the finger (step 2001).

The chin is then indicated by the finger equipped with the glove-type sensor to thereby input the relative positional relation of the chin and the finger (step 2002).

The left shoulder is indicated by the finger of the right hand and the right shoulder is indicated by the finger of the left hand to thereby input the relative positional relation (step 2003).

The positional information of the abdomen is then inputted (step 2004).

Further, information relative to the palm is normalized (step 2005). More particularly, the shapes of fingers in three states including all fingers stretched, only the thumb stretched and other fingers stretched except the thumb are registered.

When the inputting of the normalization information performed so far is not made exactly, the same operation is made again from step 2001 and when the inputting is made satisfactorily, the process proceeds to next step (step 2006).

Finally, the home position for changing over the beginning and interruption of inputting of the finger movement is inputted (step 2007). When the registration person sits and makes the sign language, the person puts both the hands on the knees to input this state to thereby register the home position.

A specific position of the fingers or hand for performing the duty of the switch for starting gathering the finger movement data is previously registered to thereby move the fingers or hand to the registered position after depressing of the button, so that the time series data relative to the subsequent finger movement can be gathered.

Correction of the relative relation of the finger and the body in the computer graphics animation for the sign language utilizing the size of the body of the registration person of the finger movement can be attained by the technique described in Japanese Patent Application No. 6-101097. Numeral 1905 represents an input button for starting inputting of the finger movement.

Numeral 1906 represents a stop button for stopping inputting of the finger movement, numeral 1907 represents a monitoring display button for displaying the sign language computer graphics animation prepared on the basis of the time series data relative to the inputted finger movement in the animation display window 1822, numeral 1908 represents a finger movement retrieval button for searching the finger movement dictionary for the sign language word including the finger movement while the inputted finger movement is used as a key, and numeral 1909 denotes a clear button for clearing the time series data relative to the input finger movement from the memory.

In the finger movement retrieval, the time series data relative to the inputted finger movement and the time series data relative to the finger movement already registered in the dictionary are collated to thereby retrieve the sign language word constituted by the inputted finger movement.

The retrieval can be attained by the sign language recognition technique described in JP-A-6-83938. The time series data relative to the inputted finger movement is stored in the finger movement dictionary.

The time series data for a plurality of frames which are parts of the series of frames constituting the computer graphics animation for the sign language or a single frame is corrected. At this time, the frame to be corrected must be selected before the correction method of data is selected.

Selection of the frame to be corrected is described with reference to FIG. 21.

Numeral 2101 represents an editing pull-down menu for selecting a kind of editing for the series of frames.

After the frame to be corrected is selected, selection is made from the editing pull-down menu to perform various editing.

Figure 21:
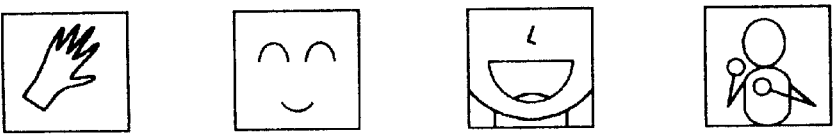
FIG. 21 is a diagram illustrating designation of a frame range.

The case where the 11st frame to the 16th frame are selected on the picture of FIG. 21 is now described by way of example.

In the sign language word basic information table 1811 for displaying information constituting the sign language word, the 11st frame 2102 is selected by the input device such as a mouse and the frames from the 11st frame to the 16th frame 2103 which is an end of the frame series to be corrected are dragged or selected. Thus, the area 2104 selected on the sign language word basic information table is reversely displayed.

The editing item can be selected from the editing pull-down menu to thereby make various correction to the time series data of the designated range.

Referring now to FIGS. 22 to 26, correction of the finger movement performed by selecting the finger movement editing button 1818 of the main window is described.

Figure 22:
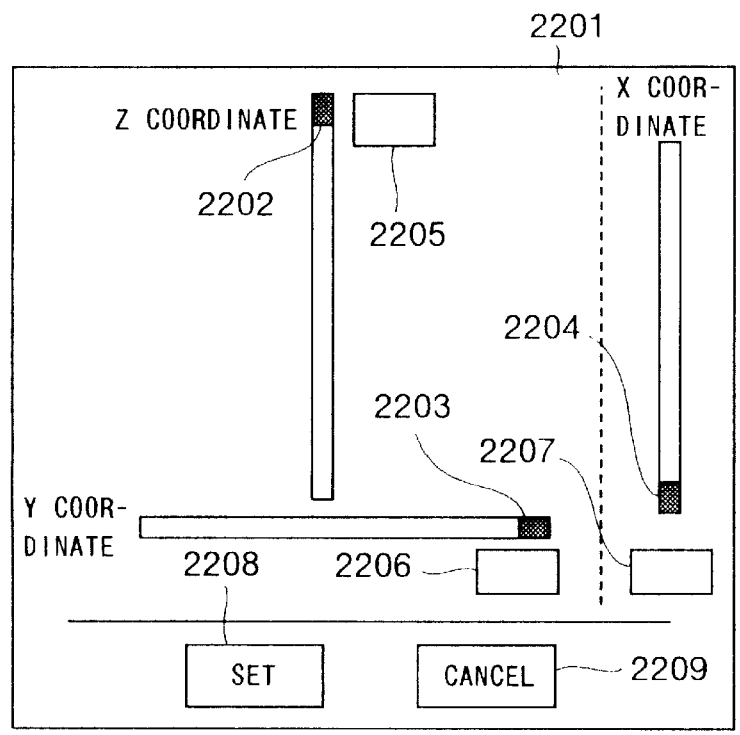
FIG. 22 is a diagram illustrating a finger position editing picture.

FIG. 22 shows a picture at the time that the position of the finger is corrected. The case where the position of the finger is corrected over a plurality of frames and the case where the position of the finger is corrected for a single frame can be both treated. An amount of variation relative to the position of the finger given herein represents an amount of relative movement of the position of the fingers.

Numeral 2201 represents a position correction window of the finger, 2202 a Z-axis slider for correcting the position of the finger in the Z-axis direction (vertical direction), 2203 a Y-axis slider for correcting the position of the finger in the Y-axis direction (in the right and left direction), and 2204 an X-axis slider for correcting the position of the finger in the X-axis direction (in the front and rear direction).

The sliders are moved to correct the position of the finger while viewing the displayed computer graphics animation for the sign language on the animation display window 1822. Further, coordinate values of Z, Y and X can be directly inputted in 2205, 2206 and 2207 to thereby correct the position of the finger.

Numeral 2208 represents a setting button for preserving the edited result and numeral 2209 represents a cancel button for canceling the edited result.

Figure 23:
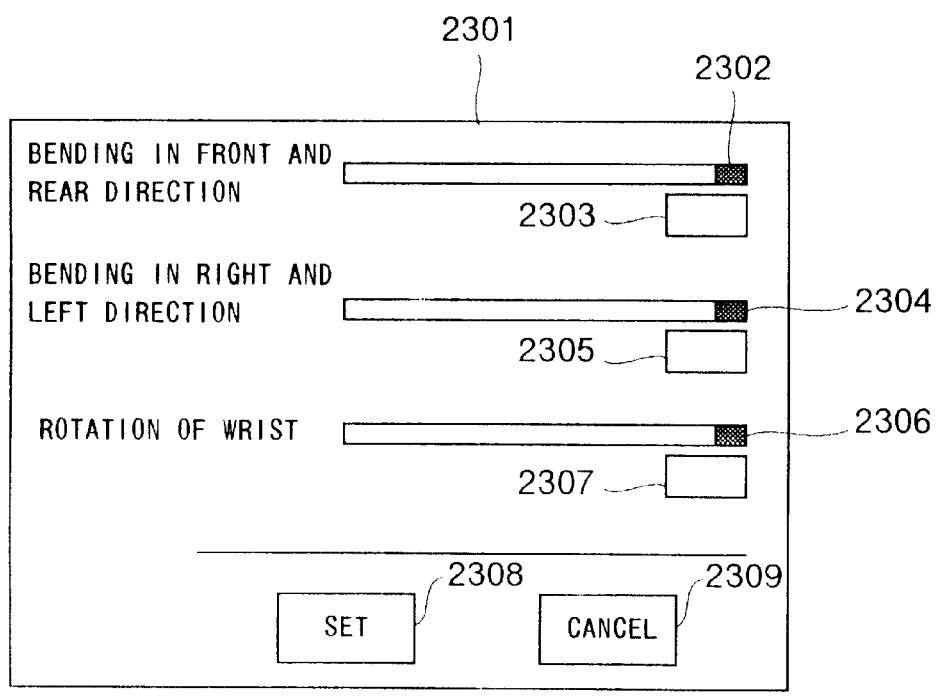
FIG. 23 is a diagram illustrating a palm direction editing picture.

FIG. 23 shows a picture at the time that the direction of the finger is corrected.

The case where the direction of the palm is corrected over a plurality of frames and the case where the direction of the palm is corrected for a single frame can be both treated.

Numeral 2301 represents an editing window for the direction of the palm, 2302 a bending slider for correcting a bending angle in the front and rear direction of the palm, 2303 a column for directly designating the angle, 2304 a bending slider for correcting a bending angle in the right and left direction of the palm, 2304 a column for directly designating the angle, 2306 a rotation slider for correcting a rotation angle of the wrist, and 2307 a column for directly designating the angle. The sliders are moved to perform correction while viewing the displayed computer graphics animation for the sign language on the animation display window 1822.

Numeral 2308 represents a setting button for preserving the edited result in the finger movement dictionary, and 2309 a cancel button for canceling the edited result.

Figure 24:
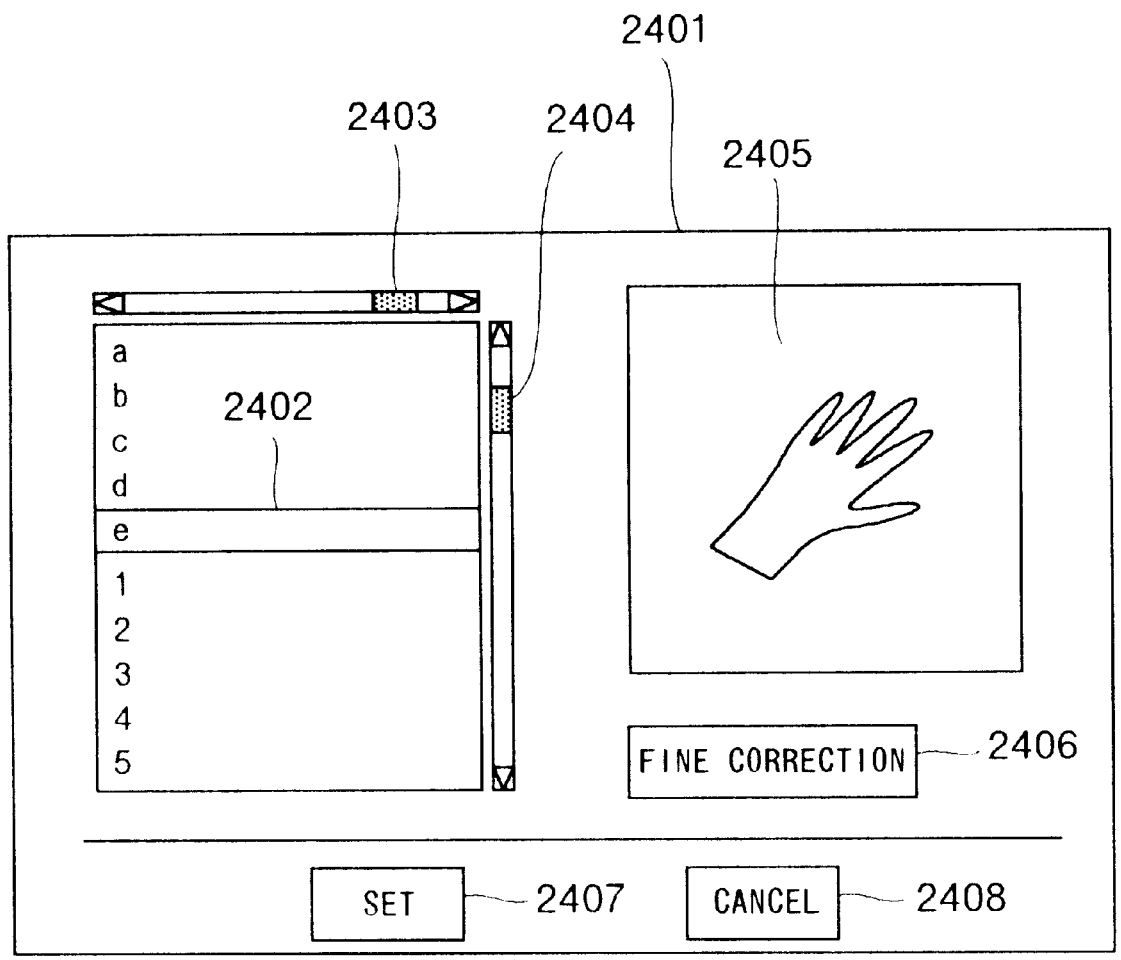
FIG. 24 is a diagram illustrating a hand shape selecting picture.

FIG. 24 shows a picture at the time that the shape of the fingers or hand is edited.

Numeral 2401 represents a finger or hand shape selection window, and 2402 the shape of fingers or hand selected from a list of shapes of fingers or hand previously prepared by means of a mouse or the like.

When the general sign language is expressed, it is said that about 50 shapes of fingers or hand are required to be prepared (Kanda: Japanese Sign Language Phonemic Notation, Japan Sign Language Society, 1991). The sample data of the shapes of fingers or hand are previously prepared with reference thereto.

Numeral 2403 represents a scroll in the right and left direction, and 2404 a scroll in the vertical direction. Numeral 2405 represents an image of the shape of the fingers or hand selected in 2402 and which is a data for one frame.

Numeral 2406 represents a fine correction button for performing more detailed correction to the selected shape of the fingers or hand, 2407 a setting button for preserving the selected result, 2408 a cancel button for canceling the selected result.

Normally, the shape of the fingers or hand of the animation can be expressed by only selection of the prepared shape of the fingers or hand. When it is desired to perform more detailed correction, the fine correction button 2406 is depressed to adjust parameters for expressing the shape of the fingers or hand.

Figure 25:
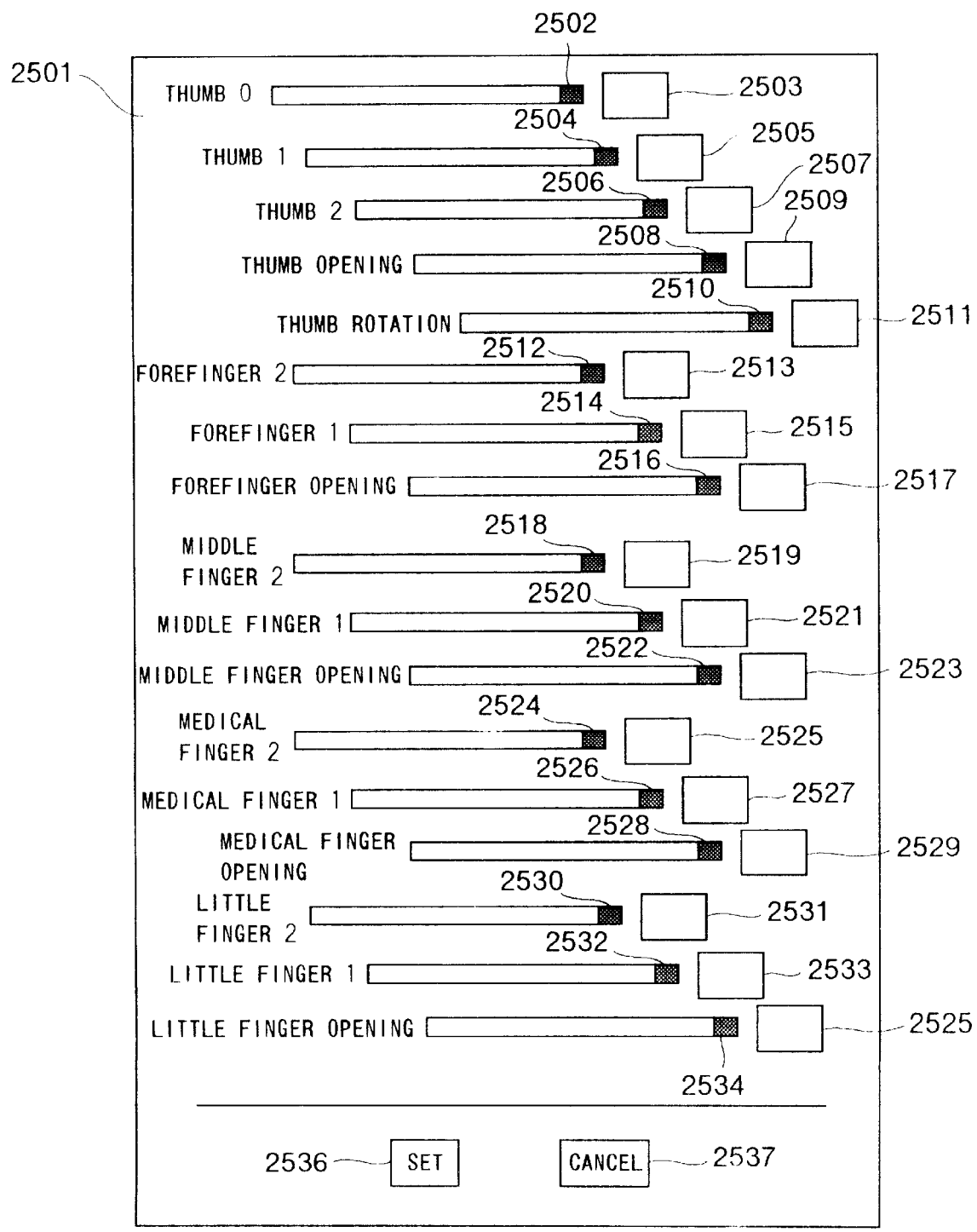
FIG. 25 is a diagram illustrating a fine correction picture of finger shape.

FIG. 25 shows a picture displayed when the fine correction button 2406 is depressed in the finger shape selection window 2401.

Numeral 2501 represents a finger shape correction window, 2502 a thumb 0 slider for correcting a bending angle of the 0-th articulation of the thumb, 2504 a thumb 1 slider. for correcting a bending angle of the first articulation of the thumb, 2506 a thumb 2 slider for correcting a bending angle of the second articulation of the thumb, 2508 a thumb opening slider for correcting an opening angle in the palm plane of the thumb, 2510 a thumb rotation slider for correcting a rotation angle of the thumb, 2512 a forefinger 2 slider for correcting a bending angle of the second articulation of the forefinger, 2514 a forefinger 1 slider for correcting a bending angle of the first articulation of the forefinger, 2516 a forefinger opening slider for correcting an opening angle in the palm plane of the forefinger, 2518 a middle finger 2 slider for correcting a bending angle of the second articulation of the middle finger, 2520 a middle finger 1 slider for correcting a bending angle of the first articulation of the middle finger, 2522 a middle finger opening slider for correcting an opening angle in the palm plane of the middle finger, 2524 a medical finger 2 slider for correcting a bending angle of the second articulation of the medical finger, 2526 a medical finger 1 slider for correcting a bending angle of the first articulation of the medical finger, 2528 a medical finger opening slider for correcting an opening angle in the palm plane of the medical finger, 2530 a little finger 2 slider for correcting a bending angle of the second articulation of the little finger, 2532 a little finger 1 slider for correcting an opening angle of the first articulation of the little finger, and 2334 a little finger opening slider for correcting an opening angle in the palm plane of the little finger.

Further, these parameters can be corrected by directly designating values thereof in the columns indicated by 2503, 2505, 2507, . . . , 2525.

Correction is made by moving the sliders while viewing the computer graphics animation for the sign language displayed on the sign language animation display window 1822.

Numeral 2536 represents a setting button for preserving the corrected result in the finger movement dictionary, and 2537 a cancel button for canceling the edited result. The setting button is depressed to preserve the corrected result for the finger shape selected in the finger shape selection window. 2501 in the finger movement dictionary.

Figure 26:
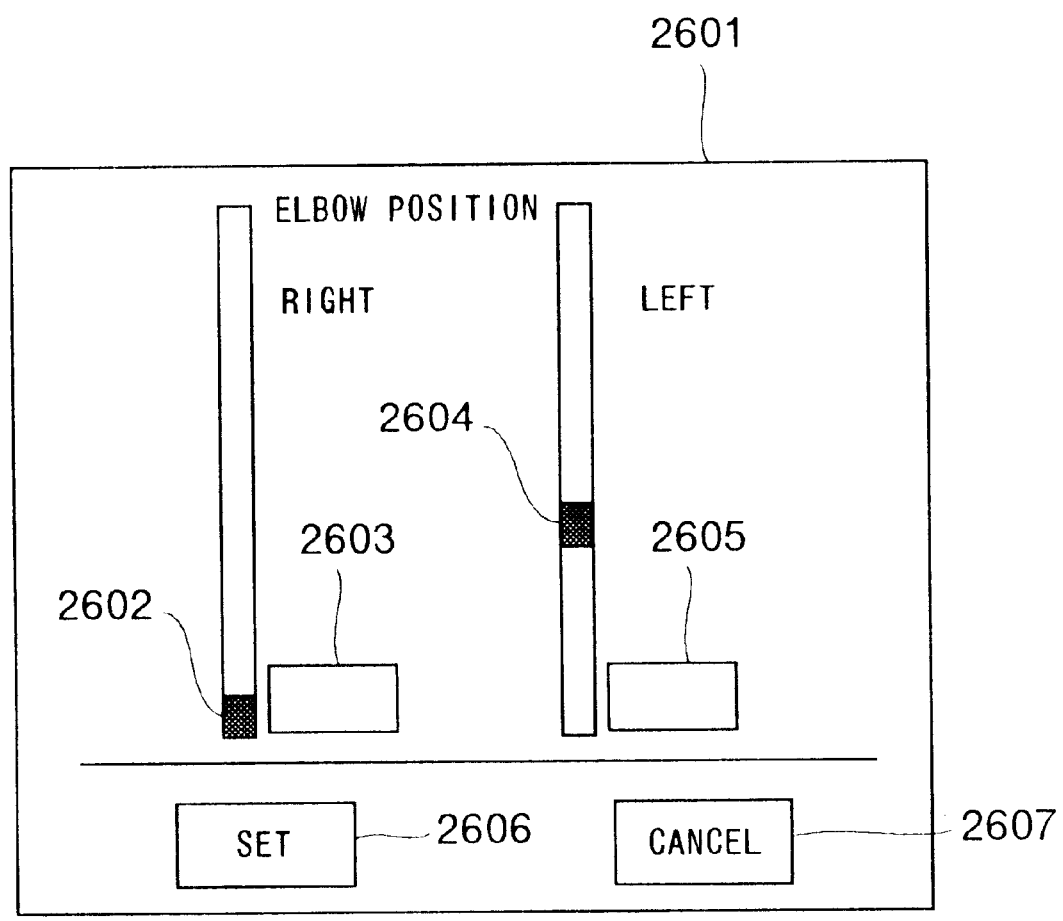
FIG. 26 is a diagram illustrating an elbow position correction picture.

FIG. 26 shows a picture for correcting the position of the elbows.

The position of the elbows cannot be inputted by the glove-type sensor and accordingly the position of the default thereof is obtained by calculation on the basis of the positions of the shoulder and the hands. On the contrary, in order to express the states such as squared elbows and closed armpits, the functions described herein are prepared.

Numeral 2601 represents an elbow position correction window, 2602 a right slider for adjusting a rotation angle of the elbow of the right hand. The rotation angle thereof can be corrected by directly designating the angle into 2603.

Numeral 2604 represents a left slider for adjusting an opening angle of the elbow of the left hand. The opening angle thereof can be corrected by directly designating the angle into 2605.

Numeral 2606 represents a setting button for preserving the edited result, and 2607 a cancel button for canceling the edited result.

The function for expanding and contracting the size of hand movement by varying the magnitude of space occupied by the loci of the hand (palm), of the correction function for the time series data relative to the finger movement shown in step 1604 of FIG. 16 is now described.

Figure 27:
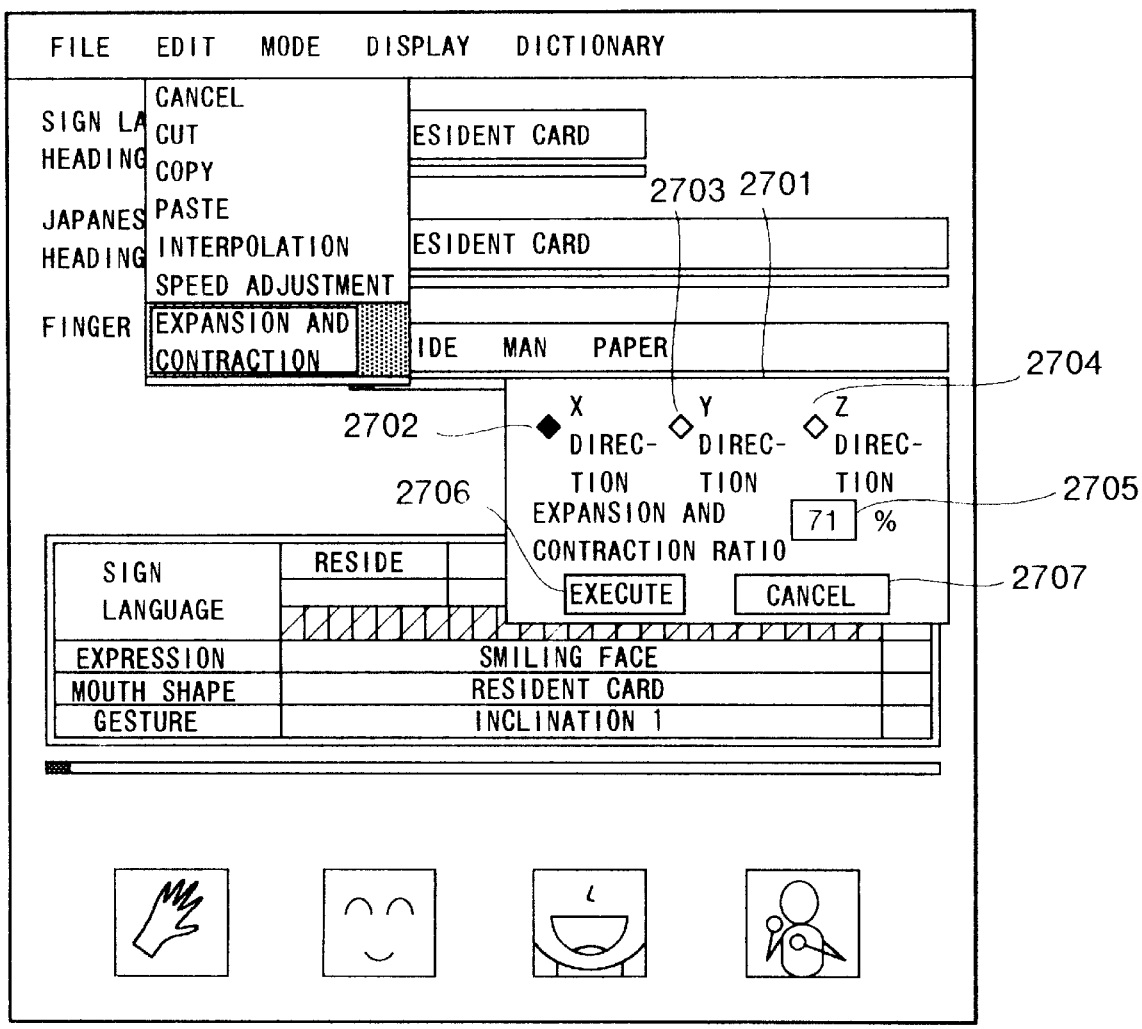
FIG. 27 is a diagram illustrating a finger movement contraction and expansion picture.

FIG. 27 shows a picture for expanding and contracting the hand movement.

When expansion is selected from the editing pull-down menu 2101 after a range for a certain frame is designated, a hand movement expansion and contraction window 2701 is displayed.

Numeral 2702 represents an X axis expansion and contraction designating button for designating whether expansion and contraction in the front and rear direction in the computer graphics picture is made or not, 2703 a Y axis expansion and contraction designating button for designating whether expansion and contraction in the right and left direction in the computer graphics picture is made or not, 2704 a Z axis expansion and contraction designating button for designating whether expansion and contraction in the vertical direction in the computer graphics picture is made or not, 2705 an expansion and contraction ratio designating column for designating the expansion and contraction ratio of hand movement to the coordinate axes designated by 2702, 2703 and 2704, 2706 an execution button for varying the hand movement in accordance to the expansion and contraction ratio inputted in 2705, and 2707 a cancel button for canceling expansion and contraction of the hand movement.

As shown in FIG. 27, when expansion and contraction in the X axis are designated by the X axis expansion and contraction designating button 2702 and the expansion and contraction ratio is designated by the expansion and contraction ratio designating column 2705, a value obtained by multiplying the expansion and contraction ratio by the X axis component of data of the frame series is prepared newly.

Figure 28A:
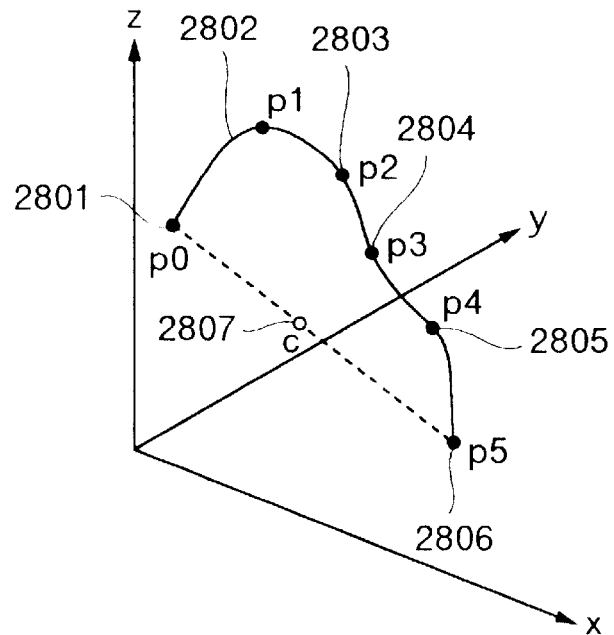
FIGS. 28A and 28B illustrate the principle of the finger movement contraction and expansion picture.
Figure 28B:
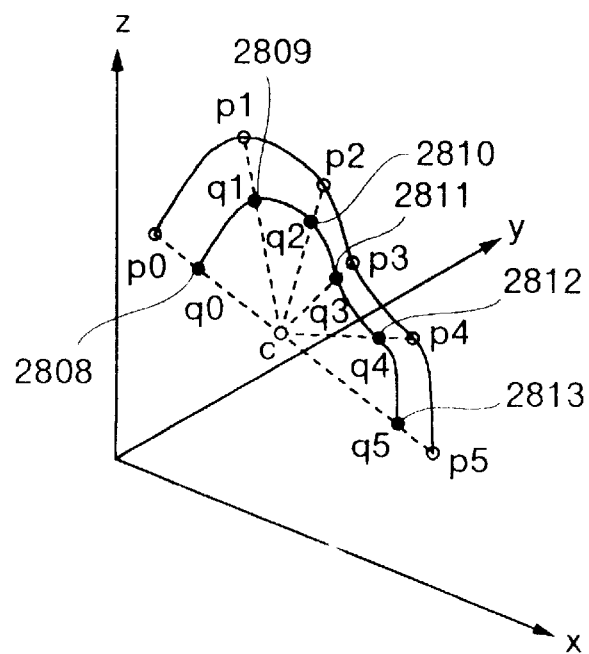
Figure 29:
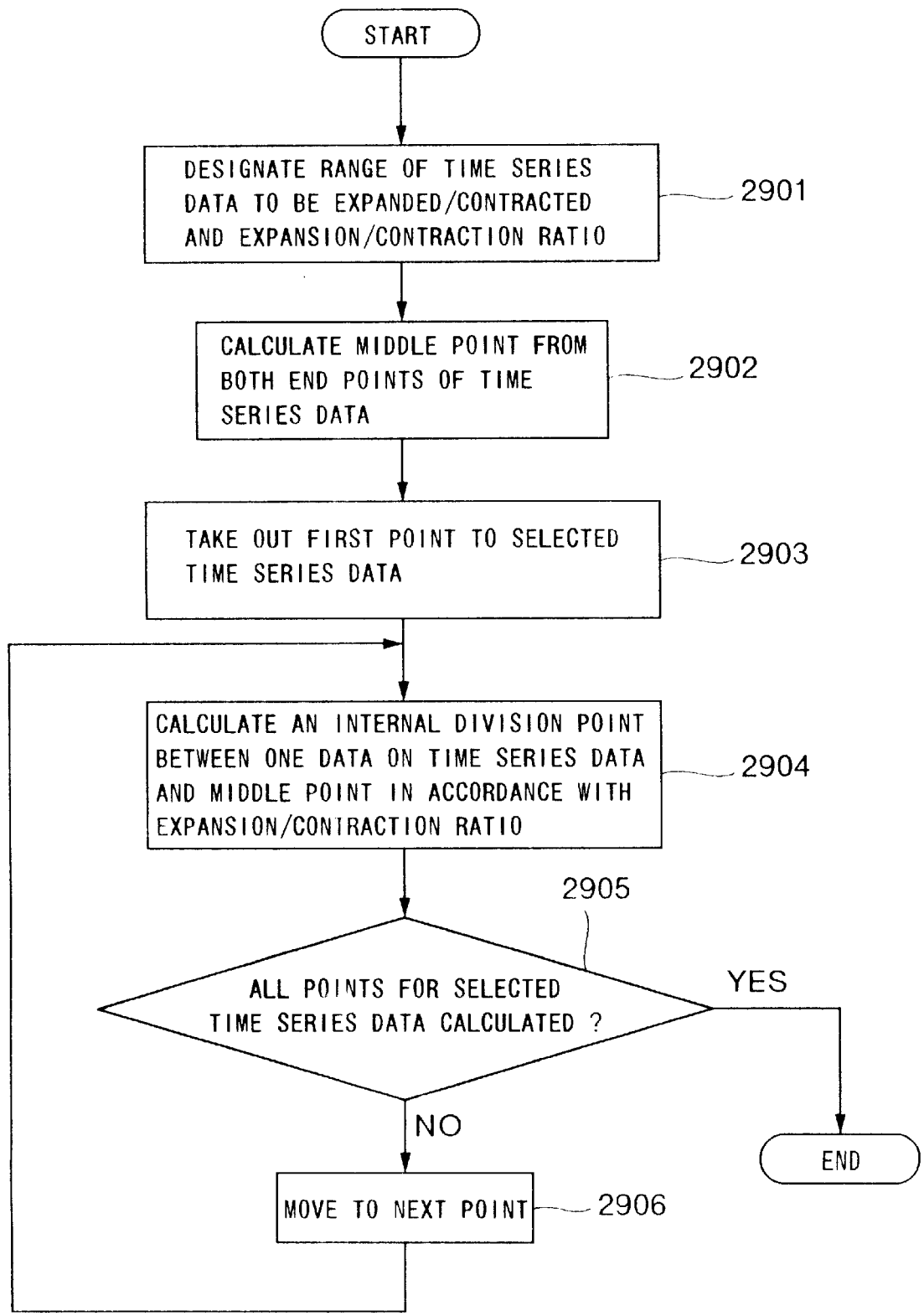
FIG. 29 is a flow chart showing a procedure of contraction and expansion of the finger movement.

Referring now to FIGS. 28 and 29, the principle of expansion and contraction of hand movement is described.

A range of the time series data to be expanded and contracted and the expansion and contraction ratio are designated (step 2901).

It is assumed that p0 (2801), p1 (2802), p2 (2803), p3 (2804), p4 (2805) and p5 (2806) of FIG. 28A are positions of the hand at certain time, and this hand movement series is expanded and contracted.

A middle point C (2807) between both ends p0 and p5 of the time series data is calculated (step 2902).

A point q0 on a straight line p0-C is calculated in accordance with an inputted expansion and contraction ratio (step 2904). The point q0 corresponds to 2808 of FIG. 28B.

When the expansion and contraction ratio is a, the point q0 satisfies the following equation:

$$\overline{cq0} = a\, \overline{cp0} \qquad \text{(Equation 1)}$$

Similarly, q1 (2809), q2 (2810), q3 (2811), q4 (2812) and q5 (2813) are calculated. q0, g1, q2, q3, q4 and q5 are loci formed by contracting the original hand movement data.

The contraction can be applied to each of the X, Y and Z axes representative of the position of the hand.

Figure 30:
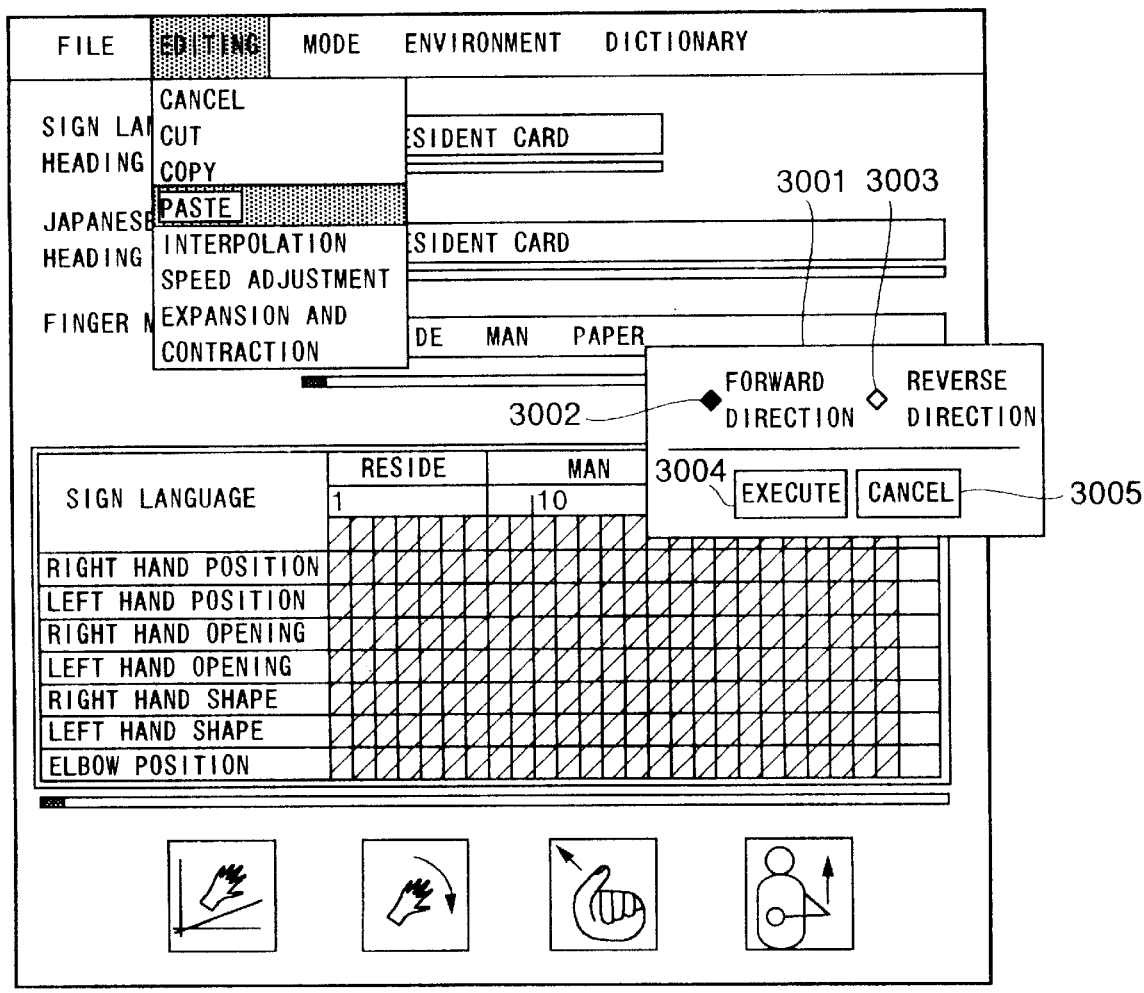
FIG. 30 is a diagram illustrating a pasting picture of frame data.

Referring now to FIG. 30, the paste of the time series data relative to the finger movement of the correction function of the finger movement shown in step 1604 is described.

2101 is the editing pull-down menu. The "paste" is selected from the editing pull-down menu, so that data for the frame introduced previously into the buffer by execution of the cut or copy are pasted.

Numeral 3001 represents a paste window displayed when the "paste" is selected in 2101, 3002 a forward direction switch for selecting the paste in the original time series order of the time series data introduced into the buffer, 3003 a reverse direction switch for selecting the paste in the reverse direction to the original time series order of the time series data in the buffer, 3004 an execution button for pasting the time series data actually on the basis of the direction of the paste set by the switches 3002 and 3003, and 3005 a cancel button for canceling the execution of the paste.

The introduction of the time series data into the buffer is made by selecting the frame by means of the frame indicator 1814 of the sign language word basis information table and selecting "cut" or "copy" of the editing pull-down menu.

Figure 31:
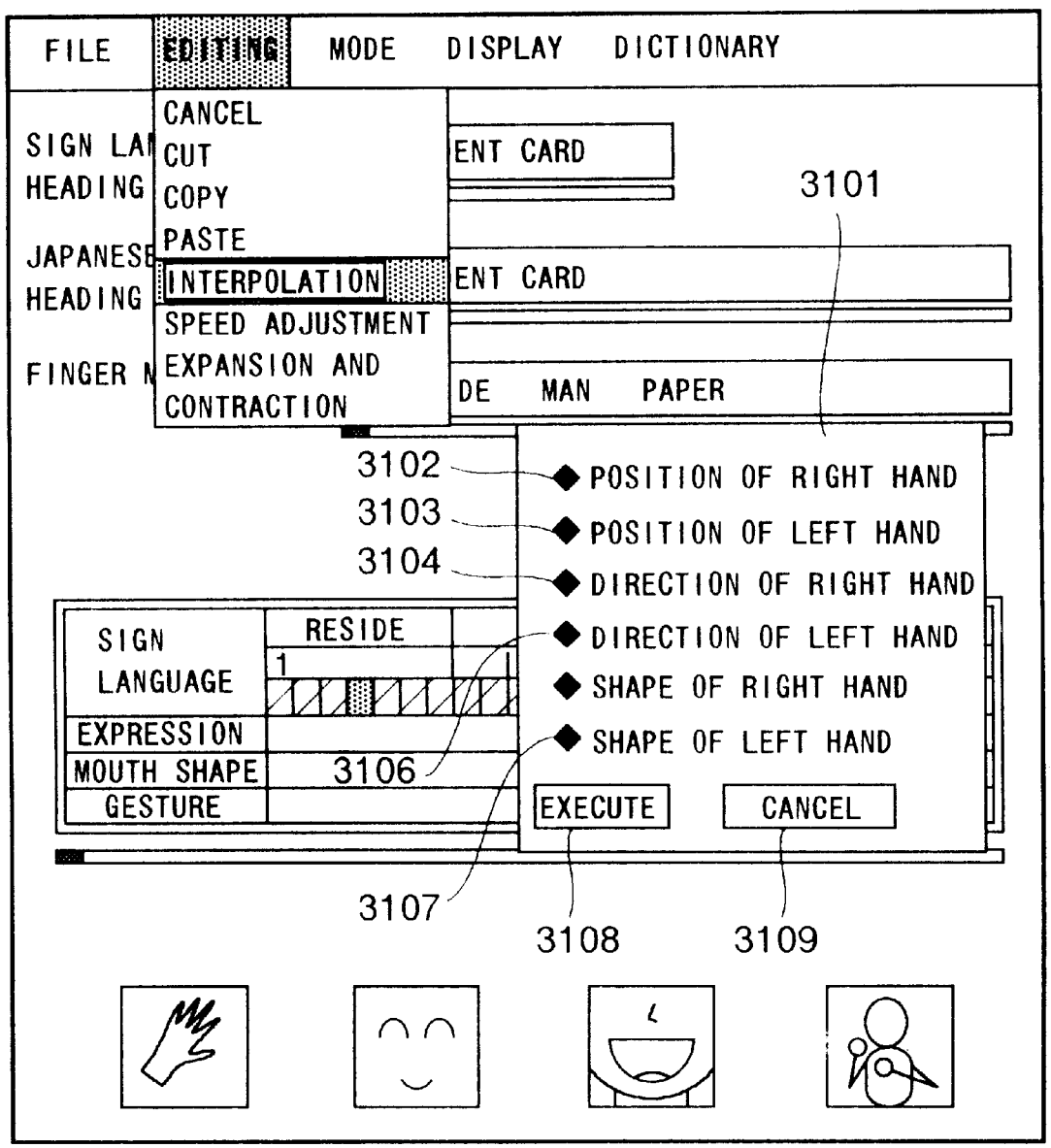
FIG. 31 is a diagram illustrating an interpolation picture of the finger movement.

Referring now to FIG. 31, interpolation of the finger movement is described.

When the interpolation is selected from the editing pull-down menu 2101 after a frame of a certain section is designated, the picture of FIG. 31 is displayed.

Numeral 3101 represents an interpolation window, 3102 a switch for selecting interpolation of the position of the right hand, 3103 a switch for selecting interpolation of the position of the left hand, 3104 a switch for selecting the direction of the right hand, 3105 a switch for selecting interpolation of the direction of the left hand, 3106 a switch for selecting interpolation of the shape of the right hand, and 3107 a switch for selecting interpolation of the shape of the left hand.

The interpolation process is performed as to the items to which execution of interpolation is designated by the switches 3102 to 3107.

Numeral 3108 represents an interpolation button for executing the interpolation on the basis of the selected result by the switches 3102 to 3107, and 3109 a cancel button for erasing the interpolation window 3101 from the picture without interpolation.

The user can select the switches 3102 to 3107 to perform interpolation with respect to any item.

Figure 32:
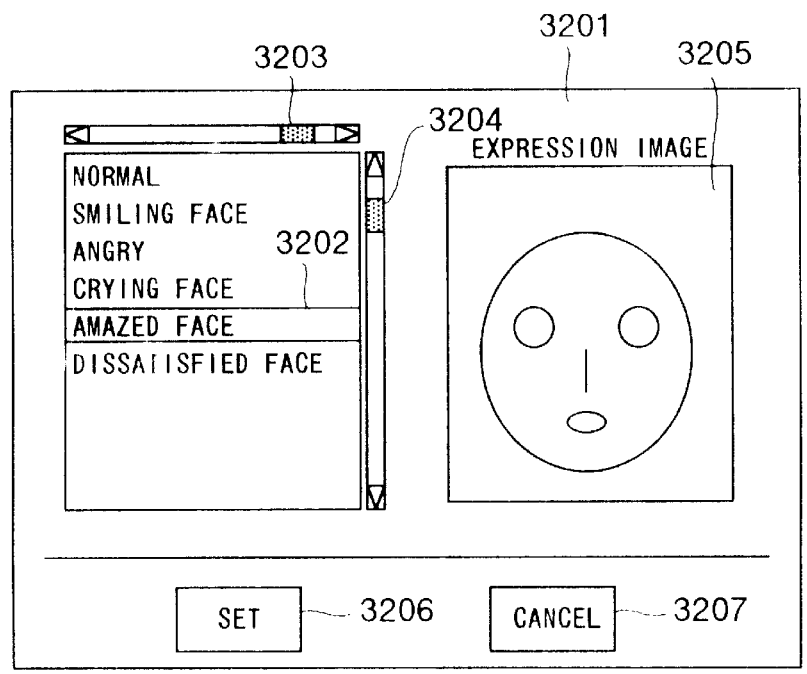
FIG. 32 is a diagram illustrating an expression editing picture.
Figure 33:
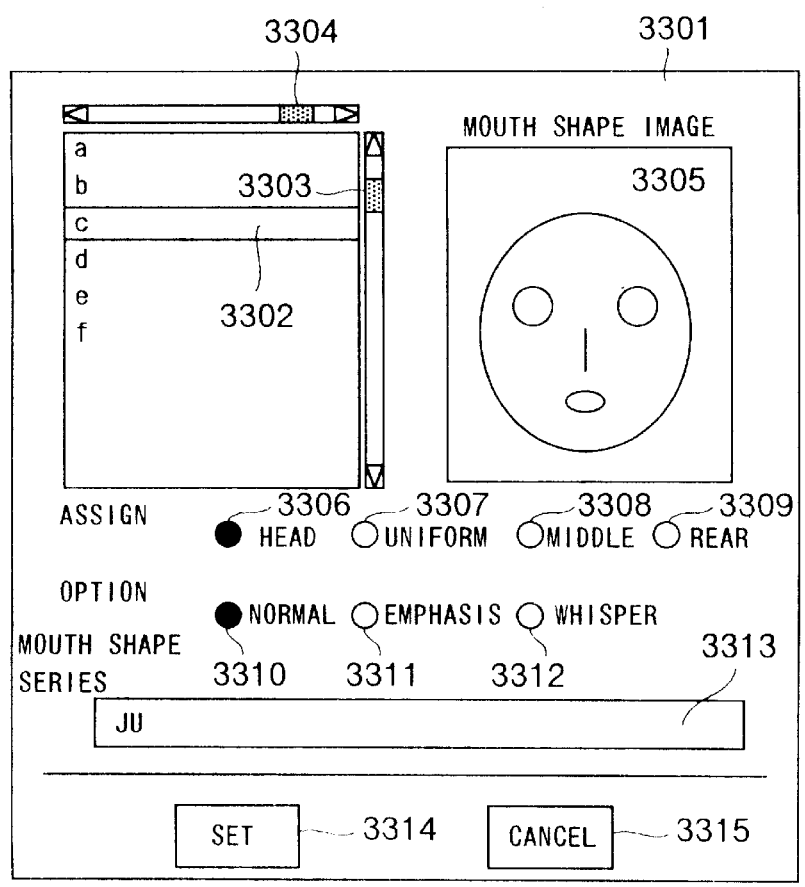
FIG. 33 is a diagram illustrating a mouth shape editing picture.
Figure 34:
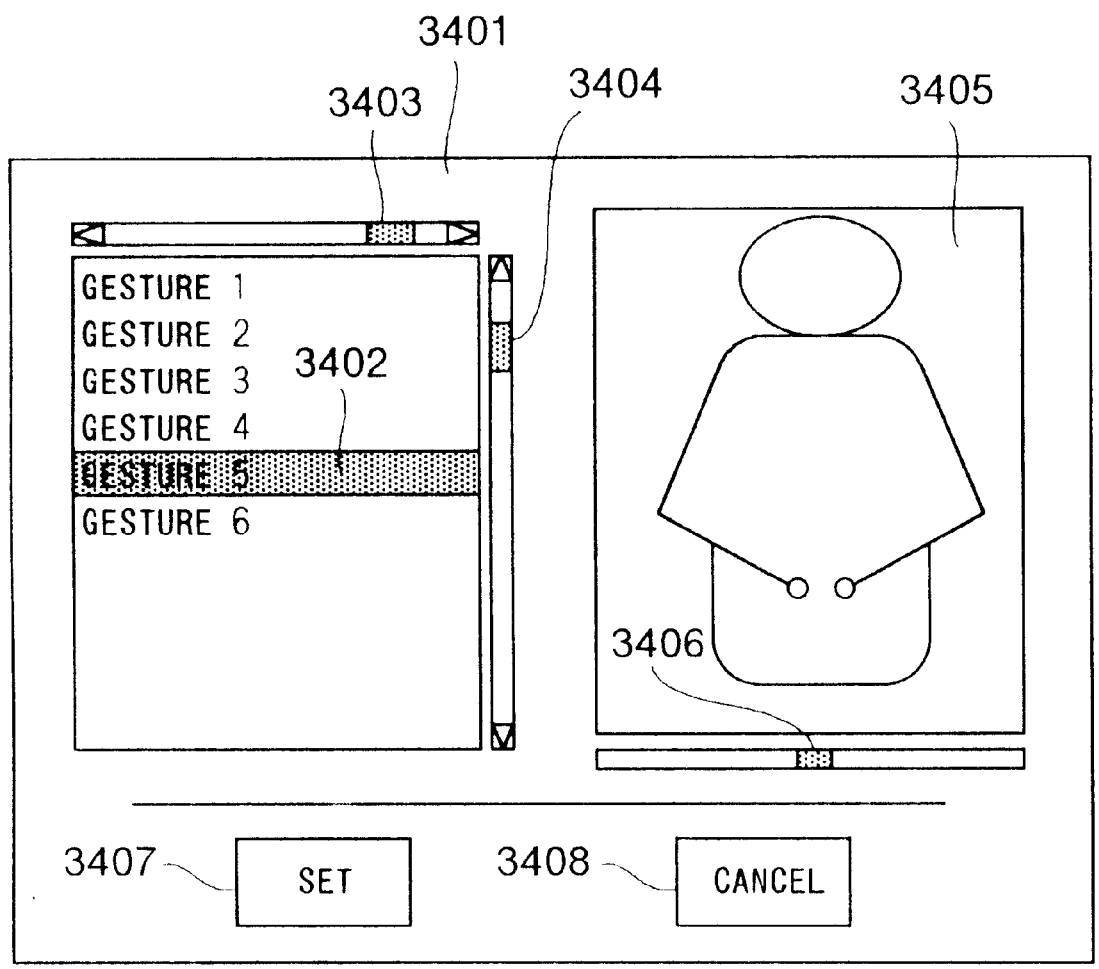
FIG. 34 is a diagram illustrating a gesture editing picture.

Referring now to FIGS. 32, 33 and 34, addition of the mouth shape, the expression and the gesture in step 1606 is described.

FIG. 32 is a diagram illustrating addition of the expression to the sign language word.

When the frame to which the expression is desired to be added is selected in the frame indicator 1814 and the expression editing button 1819 is depressed, the expression editing window 3201 is displayed.

Numeral 3202 represents a list of headings for expression data previously registered in the expression dictionary. The user can select a proper heading from the list to add the expression data to the sign language word data. The selected heading is reversely displayed.

Numeral 3203 represents a scroll bar for scrolling the expression heading list in the vertical direction, and 3204 a scroll bar for scrolling the expression heading list in the horizontal direction.

Numeral 3205 represents an expression display window for displaying the expression data selected from the list 3202. The expression data corresponding to the reversely displayed expression heading is loaded from the expression dictionary 404 and is displayed in the window 3205.

Numeral 3206 represents a setting button for actually adding the expression data selected from the list to the sign language word, and 3207 a cancel button for canceling the above work.

The user can merely select the heading of expression to add the expression to the sign language animation.

FIG. 33 is a diagram illustrating addition of the mouth shape to the sign language word.

When the frame to which the mouth shape is desired to be added is selected in the frame indicator 1814 and the mouth shape editing button 1820 is depressed, a mouth shape editing window 3301 is displayed.

Numeral 3302 represents a list of headings for mouth shape data previously registered in the mouth shape dictionary. The user can select a proper heading from the list to prepare the mouth shape series data and add the data to the sign language word data.

Numeral 3303 represents a scroll bar for scrolling the mouth shape heading list in the vertical direction, and 3304 a scroll bar for scrolling the mouth shape heading list in the horizontal direction.

Numeral 3305 represents a mouth shape display window for displaying the mouth shape data selected from the list 3302. Numerals 3306 to 3309 represent buttons for designating how to assign the mouth shape series to the selected frame data. When the button 3306 is selected, the mouth shape series is assigned to the head of the frame data series. When the button 3307 is selected, the mouth shape series is assigned uniformly over the whole frame data series. When the button 3308 is selected, the mouth shape series is assigned to the middle of the frame data series. When the button 3309 is selected, the mouth shape series is assigned to the end of the frame data series. These buttons are exclusive and only one button can be selected.

Difference in timing of the expression of the mouth shape and the finger movement can be added to each sign language word so that the mouth shape is expressed slowly while performing the finger movement and the mouth shape is expressed at a breath at the beginning of the finger movement. Thus, the meaning corresponding to the context can be added to the sign language animation.

Numerals 3310 to 3312 represent buttons for adding variation to the size of movement of the lips. When the button 3310 is selected, the standard mouth shape data in the mouse shape dictionary is assigned. When the button 3311 is selected, the mouth shape data having large movement of the lips in the mouth shape dictionary is assigned.

When the button 3312 is selected, the mouth shape data having small movement of the lips in the mouth shape dictionary is assigned. More particularly, changed parameters expressing the lips in the mouth shape data 709 in the mouth shape dictionary is assigned. These buttons are also exclusive and only one button can be selected.

Numeral 3313 represents a mouth shape series display column in which the headings of the mouth shape data selected from the list 3302 are displayed in order of selection. The mouth shape data series displayed therein is the mouth shape series 702. Numeral 3314 represents a setting button for preserving the edited result as the sign language word data, and 3314 a cancel button for canceling the edited result.

FIG. 34 is a diagram illustrating addition of gesture to the sign language word.

When the frame to which expression is desired to be added is selected in the frame indicator 1814 and the gesture editing button 1821 is depressed, a gesture editing window 3401 is displayed.

Numeral 3402 represents a list of headings for gesture data registered previously in the gesture dictionary. The user can select a proper heading from the list 3402 to add the gesture data to the sign language data. The selected heading of the sign language word is reversely displayed as shown in FIG. 34.

Numeral 3403 represents a scroll bar for scrolling the list of the gesture data headings in the horizontal direction, and 3404 a scroll bar for scrolling the list of the gesture data heading in the vertical direction.

Numeral 3405 represents a gesture display window for displaying gesture data in the gesture dictionary with respect to the gesture data heading selected from the list 3402, and 3406 a slider for rotating the direction of a model of the human body of the computer graphics animation for the sign language.

Numeral 3407 represents a setting button for preserving the edited result as the sign language word data, and 3408 a cancel button for canceling the edited result. Thus, the user can merely select the heading of the gesture data to thereby add the gesture data to the sign language word.

When the sign language word data is completed by means of the above-mentioned work, the sign language word preservation is selected from the file pull-down menu 1801 to preserve the sign language word data in the sign language word dictionary. This process corresponds to the process in step 1606.

The above process is a flow of the editing process of the sign language word data.

Figure 35:
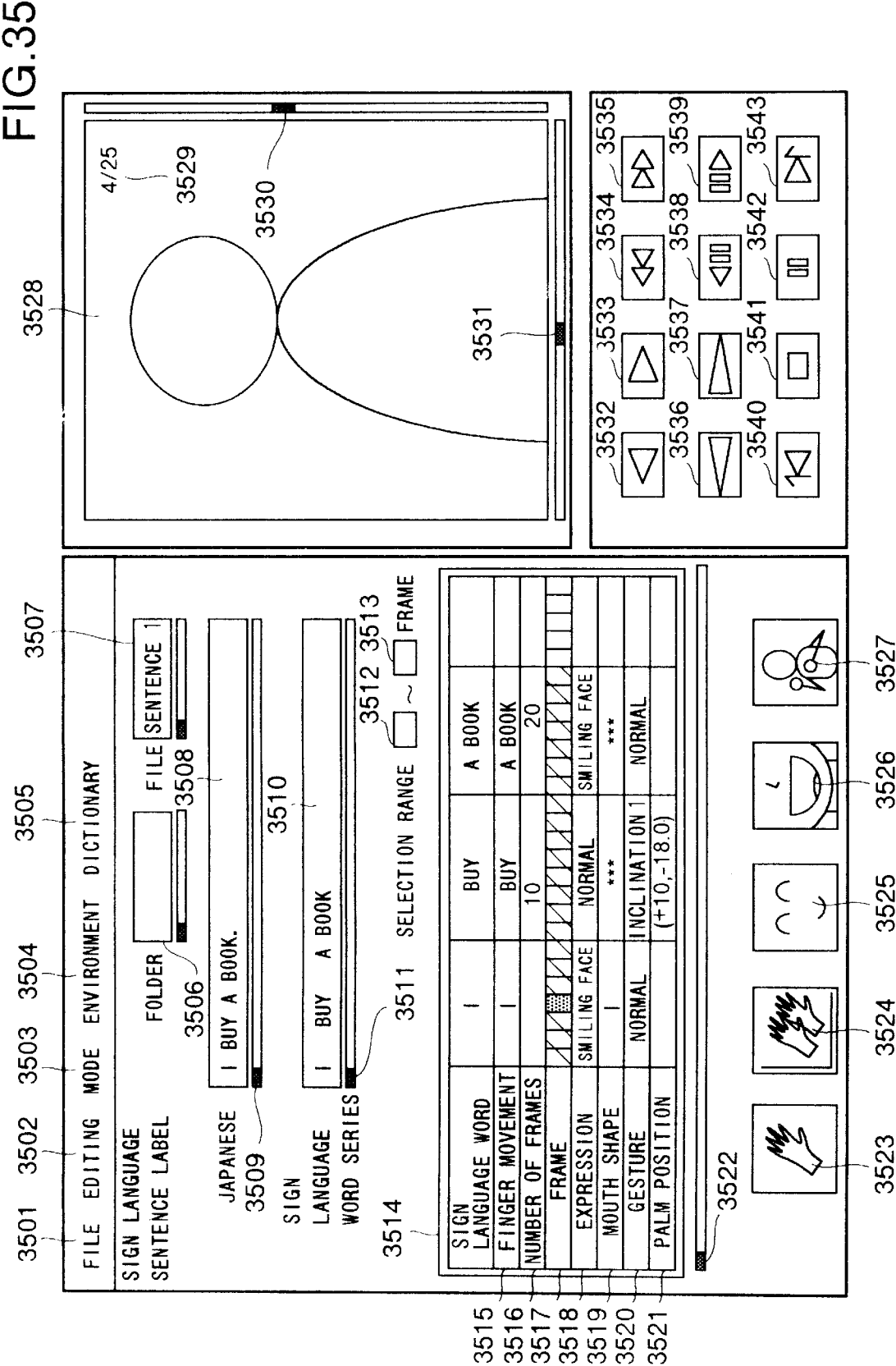
FIG. 35 is a diagram illustrating a sign language sentence data editing picture.

Referring now to FIG. 35, editing of the sign language sentence animation is described.

When the sign language sentence editing picture is selected from the mode pull-down menu 1803 in the sign language word data editing picture, the sign language sentence data editing picture of FIG. 35 is displayed.

Numeral 3501 represents a file pull-down menu for calling the sign language sentence data prepared by combining the time series data for the sign language words and preserving the data in the sign language sentence dictionary.

Numeral 3502 represents an editing pull-down menu for performing cut, copy, interpolation, adjustment of display speed, compression and expansion of operation and the like with respect to the time series data relative to the finger movement of the sign language data and changing data registered as the original sign language word data.

Numeral 3503 represents a mode pull-down menu for switching editing of the sign language sentence data and editing of the sign language word data.

Numeral 3504 represents a display pull-down menu for designating whether parameters relative to the position, the direction and the shape of the fingers are displayed together with the sign language animation or not.

Numeral 3505 represents a dictionary pull-down menu for selecting the dictionary in which the animation data of the edited result are registered.

Data concerning the prepared sign language sentences are collected as a collected sentences (folder) for each kind of sentences used in application, for example, such as sentences used in the automatic cash dispenser.

Numeral 3506 represents a folder name designating column for inputting and displaying a heading of the collected sentences of the heading 501 (FIG. 5) of the sign language sentence to be edited.

Numeral 3507 represents a file name designating column for inputting and displaying the sign language sentence heading given to each sign language sentence data in order to identify the sign language data to be edited.

Numeral 3508 represents a translated Japanese display column for inputting and displaying the translated Japanese 502 for the sign language sentence, and 3509 a scroll bar for scrolling the translated Japanese in the horizontal direction.

Numeral 3510 represents a sign language word input display column for inputting and displaying the sign language word heading 505 constituting the sign language data to be edited in order of arrangement thereof, and 3511 a scroll bar for scrolling the sign language word series 3510 in the horizontal direction.

When a sign language word heading is inputted in the column 3510, the sign language word data for the heading is retrieved from the sign language word dictionary. This retrieval corresponds to the process in step 1702 (FIG. 17).

When a frame of a certain section is selected in the editing work, the number of the beginning frame thereof is displayed in 3512 and the number of the end frame is displayed in 3513.

Numeral 3514 represents a sign language sentence basic information table for displaying information relative to finger movement, expression, mouth shape and gesture registered in the sign language word data constituting the sign language sentence. The retrieved result of the sign language word data by 3510 is displayed.

The heading of the sign language word constituting the sign language sentence data to be edited is displayed in 3515 and the heading of the finger movement data constituting the sign language word data is displayed in 3516.

Numeral 3517 represents a frame indicator used when a frame of a certain section is selected in the edited work.

The expression heading assigned as the expression data is displayed in 3518, the mouth shape heading assigned as the mouth shape data is displayed in 3519, and the gesture heading assigned as the gesture data is displayed in 3520.

When a sentence of the sign language is expressed, the expression position of the finger movement constituting the sentence is often changed. Such change of the movement position is expressed by a difference from the movement position of the sign language word data in the sign language word dictionary and is held in the sign language sentence data as change data 509 relative to the finger movement. The difference data relative to the position of the palm is displayed in 3521.

Numeral 3522 represents a scroll bar for scrolling the data displayed in the sign language sentence basic information table 3514 in the horizontal direction.

Numeral 3523 represents a finger movement editing button for correcting the finger movement data by depressing the button 3523 after a certain frame section is selected in the sign language sentence basic information table 3514.

Numeral 3524 represents a finger movement position editing button for editing the position of the palm by depressing the button 3524 after a certain frame section is selected in the sign language sentence basic information table 3514.

Numeral 3525 represents an expression editing button for editing expression data by depressing the button 3525 after a certain frame section is selected in the sign language basic information table 3514.

Numeral 3526 represents a mouth shape editing button for editing the shape of mouth by depressing the button 3526 after a certain frame section is selected in the sign language sentence basic information table 3514.

Numeral 3527 represents a gesture editing button for editing the gesture data by depressing the button 3527 after a certain frame section is selected in the sign language sentence basic information table 3524.

Numeral 3528 represents a sign language animation display window for displaying the computer graphics animation of the sign language, 3529 an indicator for indicating the total number of frames constituting the sign language word data and the position of the currently displayed frame, 3530 a knob or handle for changing the direction of the expression of the sign language animation in the vertical direction, and 3531 a knob or handle for changing the display of the sign language animation in the horizontal direction.

Numeral 3532 represents a button for reproducing the sign language animation in the reverse direction, 3533 a button for starting reproduction of the sign language animation, 3534 a button for reproducing the sign language animation in the reverse direction at a double speed, 3535 a button for reproducing the sign language animation in the forward direction at a double speed, 3536 a button for reproducing the sign language animation in the reverse direction at a half speed, 3537 a button for reproducing the sign language animation in the forward direction at a half speed, 3538 a button for reproducing the sign language animation in the reverse direction by one frame, 3539 a button for reproducing the sign language animation in the forward direction by one frame, 3540 a button for moving to the beginning frame of the sign language animation, 3541 a button for stopping reproduction of the sign language animation, 3542 a button for interrupting reproduction of the sign language animation, and 3543 a button for moving to the end frame of the sign language animation. Such pictures are used to edit the sign language sentence data.

In step 1702 (FIG. 17), when the necessary sign language word data are not registered, the sign language word data are edited and registered by the method illustrated in FIG. 16. Insertion of pause in the sign language sentence data in step 1704 is attained by inputting a mark of "P, number" as shown in FIG. 36 in the sign language word series column 3510 of the sign language se sentence editing window (3601).

The final frame of the sign language word data just before "P, number" is displayed repeatedly by the number of times designated by the "number" to thereby express the pause. The pause is displayed in the sign language sentence basic information table as shown by 3602 of FIG. 36.

Correction of the finger movement, editing of the expression, editing of the mouth shape and editing of the gesture performed for the edited result in step 1705 can be attained by the same method as the method described in editing of the sign language word data.

The sign language sentence data prepared as above are preserved in the sign language display dictionary.

As described in the above embodiment, the animation data for the sign language word can be expressed by the combined finger movements to thereby share data between the sign language words having the same finger movement to reduce a memory area and maintain the consistency between the sign language words by correction of the finger movement.

Further, the expression data, the mouth shape data and the gesture data can be designated not only to the sign language word but also to the sign language sentence when the animation of the sign language sentence is prepared, to thereby prepare the more natural sign language animation.

Furthermore, provision of the interface for facilitating correction of the animation data can simplify the preparation work of the animation data which is the bottleneck when the sign language is displayed by the animation.

In addition, information relative to the expression, the shape of mouth, the gesture and the like can be selected from the previously registered data to thereby prepare the sign language animation simply.

Further, when the sign language word data are combined to prepare the animation of the sign language sentence, pause can be inserted between words easily and the sign language word data are corrected easily in accordance with the context to thereby prepare the understandable sign language animation.

We claim:

1. A sign language animation editing apparatus comprising:

a glove-type sensor for converting hand movement of in the sign language into an electrical signal to produce sign language word data which is a time series of n-dimensional vectors including data of finger shapes, hand directions and hand positions;

a sign language word data editing device for adding additional data to the sign language word data inputted from said glove-type sensor to generate sign language word animation data;

a sign language word dictionary for storing said sign language words animation data generated by said sign language word data editing device;

input means for inputting predetermined characters and operations corresponding to the apparatus;

a sign language sentence data editing device for reading out said sign language word animation data to generate sign language sentence animation data by correcting and adding predetermined additional information;

a sign language animation synthesizing device for generating sign language animation; and a display unit for displaying the sign language animation produced by said sign language synthesizing device.

2. A sign language animation editing apparatus according to claim 1, further comprising a sign language sentence dictionary for storing said sign language sentence animation data generated by said sign language sentence data editing device and wherein said sign language sentence data editing apparatus reads out sign language sentence animation data stored in said sign language sentence dictionary to produce a new sign language animation data when generating a sign language sentence in accordance with characters inputted from said input means.

3. A sign language animation editing apparatus according to claim 1, wherein an output of said sign language word data editing device is connected to said sign language animation synthesizing device so that animation of the sign language word animation data produced by said sign language word data editing device is carried out on said display unit.

4. A sign language animation editing apparatus according to claim 1, wherein said sign language word data editing device includes:

means for performing fine correction with respect to position of hands, direction of hands, shape of fingers and position of elbow to the sign language word data in accordance with instructions inputted from said input means so that hand movement is corrected to be able to view the hand movement naturally as the sign language, means for reading out one or more registered sign language word data, means for adding non-manual information in accordance with instructions inputted from said input means to said read-out sign language word data to produce the sign language animation word data, and means for storing said sign language word animation data in said sign language word dictionary.

5. A sign language animation editing apparatus according to claim 4, wherein said non-manual information includes the shape of mouth, expression and gesture.

6. A sign language animation editing apparatus according to claim 5, comprising:

means for reading out the sign language word animation data stored in said sign language word dictionary to combine in accordance with sign language word animation data inputted from said input means;

means for carrying out correction and addition of information of hand movement and non-manual information varied according to sentence, concerned with any one of each sign language word among combined animation data, or over a plurality of sign language words, or a part of sign language word, according to operations inputted from said input means; and means for displaying the information of hand movement or non-manual information corrected or added on a display as the sign language animation in real time, and for carrying out correction or addition of hand movement or non-manual information interactively with reference to displayed sign language animation.

7. A sign language animation editing apparatus according to claim 6, wherein said means for preparing the sign language sentence animation data adds the mouth shape, the expression and the gesture over a plurality of sign language animation word data when the sign language sentence animation data is expressed exactly in accordance with the instructions inputted by said input means.

8. A sign language animation editing apparatus according to claim 6, wherein said sign language sentence editing device changes hand movement continuously smoothly in accordance with time range concerned with sign language word animation data and instructions of correcting method of hand movement inputted by said input means.

9. A sign language animation editing apparatus according to claim 6, wherein said sign language sentence data editing device changes sign language sentence animation data and instructions of selecting hand movement or non-manual information which is the object of the change inputted by said input means.

10. A sign language animation editing apparatus according to claim 6, comprising means for inserting a pause between the sign language word animation data in accordance with designation of a mark representative of a pause between the sign language words and a length thereof inputted from said input means to intonate the animation expressing the sign language.

11. A sign language animation editing apparatus according to claim 6, comprising means to change a size of space occupied by loci of the hand movement in animation data in accordance with the designated expansion and contraction ratio and a time range in sign language word animation data or sign language sentence animation data inputted from said input means.

12. A sign language animation editing apparatus according to claim 5, said sign language word data editing device and sign language sentence data editing device add the data concerning the shape of mouth to the sign language word animation data or sign language sentence animation data by selecting the data concerning the shape of mouth from previously registered samples in accordance with instructions by said input means.

13. A sign language animation editing apparatus according to claim 12, wherein said sign language word data editing device and sign language sentence date editing device can add the mouth shape data to the head of time range of each sign language word animation data or plurality of sign language word animation data, the whole time range uniformly, the middle of the time range or the end of the time range.

14. A sign language animation editing apparatus according to claim 5, wherein said sign language word data editing device and sign language sentence data editing device add the data concerning facial expression to the sign language word animation data or sign language sentence animation data by selecting the data concerning facial expression from previously registered samples in accordance with instructions inputted from said input means.

15. A sign language animation editing apparatus according to claim 5, wherein said sign language word data editing device and sign language sentence data editing device add the data concerning non-manual gesture like head movement to the sign language word animation data or sign language sentence animation data by selecting the data concerning non-manual gesture from previously registered samples in accordance with instructions inputted from said input means.

\* \* \* \* \*